(12) United States Patent
Lopez Ruiz et al.

(10) Patent No.: US 11,068,321 B2
(45) Date of Patent: Jul. 20, 2021

(54) SYSTEM AND METHOD FOR DYNAMICALLY DELIVERING CONTENT

(71) Applicant: Amadeus S.A.S., Biot (FR)

(72) Inventors: Eduardo Rafael Lopez Ruiz, Juan-les-Pins (FR); Nicolas Guillon, Mouans-Sartoux (FR); Jeremie Bonfil-Praire, Saint-Laurent du Var (FR); Loïc Driencourt, Chateauneuf (FR); Melinda Monteillet, Pegomas (FR); Davide Romito, Antibes (FR); Qinglin Ye, Vallauris (FR); Frederick Casal, Mougins (FR); Fabrice Mantoan, Arlington, MA (US)

(73) Assignee: AMADEUS S.A.S., Biot (FR)

( * ) Notice: Subject to any disclaimer, the term of this patent is extended or adjusted under 35 U.S.C. 154(b) by 95 days.

(21) Appl. No.: 16/629,465

(22) PCT Filed: Jul. 6, 2018

(86) PCT No.: PCT/EP2018/068374
§ 371 (c)(1),
(2) Date: Jan. 8, 2020

(87) PCT Pub. No.: WO2019/011805
PCT Pub. Date: Jan. 17, 2019

(65) Prior Publication Data
US 2021/0133006 A1    May 6, 2021

(30) Foreign Application Priority Data
Jul. 13, 2017   (FR) ..................... 1756718

(51) Int. Cl.
*G06F 9/54* (2006.01)
*G06F 16/2457* (2019.01)

(52) U.S. Cl.
CPC ........ *G06F 9/541* (2013.01); *G06F 16/24578* (2019.01)

(58) Field of Classification Search
None
See application file for complete search history.

(56) References Cited

U.S. PATENT DOCUMENTS 10,171,546 B2 *  1/2019  Kitazato ............ H04N 21/4325
2002/0032589 A1  3/2002  Shah
(Continued)

OTHER PUBLICATIONS

National Institute of Industrial Property, Preliminary Search Report issued in Application No. 1756718 dated Jun. 14, 2018.
(Continued)

*Primary Examiner* — Craig C Dorais
(74) *Attorney, Agent, or Firm* — Thompson Hine LLP

(57) ABSTRACT

Systems and methods for dynamically delivering content from a content provider system to a user device. A bridging device is configured to dynamically connect an application executing on the user device to the content provider system during execution of an application extension of the application. The application extension is configured to activate a connection to the bridging device, in response to the detection of an activation condition. The application is configured to transmit at least some of the data items comprised in each input data block received at the user device as input data via an application interface to the bridging device during the connection to the bridging device. The bridging device is configured to generate a request for content according to a predefined request format using the data items in the input data received from the application and to transmit the request to the content provider system.

23 Claims, 14 Drawing Sheets

(56) References Cited

U.S. PATENT DOCUMENTS

| | | |
|---|---|---|
| 2003/0023463 A1 | 1/2003 | Dombroski et al. |
| 2005/0130613 A1* | 6/2005 | Kutsuna ............. H04N 21/4227 |
| | | 455/179.1 |
| 2008/0201178 A1 | 8/2008 | Vizitei |
| 2009/0327507 A1* | 12/2009 | Douillet ........... H04N 21/64322 |
| | | 709/230 |
| 2013/0046788 A1 | 2/2013 | Goldstein et al. |
| 2015/0371155 A1 | 12/2015 | Saint-Just et al. |
| 2017/0068551 A1 | 3/2017 | Vadodaria |

OTHER PUBLICATIONS

The International Bureau of WIPO, International Preliminary Report on Patentability issued in PCT/EP2018/068374 dated Jul. 13, 2017.
New Zealand Intellectual Property Office, Patent Examination Report 1 dated Nov. 13, 2020 in Application No. 760614.
New Zealand Intellectual Property Office, Patent examination report 2 dated Apr. 15, 2021 in Application No. 760614.
European Patent Office, International Search Report and Written Opinion issued in International Application No. PCT/EP2018/068374 dated Jul. 31, 2018.

* cited by examiner

SYSTEM AND METHOD FOR DYNAMICALLY DELIVERING CONTENT

TECHNICAL FIELD

The invention generally relates to computers and computer software and, in particular, to systems, methods, and computer program products for dynamically delivering content.

BACKGROUND

Many developments of modern computerized platforms are dedicated to the optimization of information exchange between computerized systems or devices. In particular, in a client/server architecture, a client computing device (user device) can request content from a server computing device or system (content provider system) via a communication network.

A major challenge for content provider systems is to deliver as quickly as possible and as efficiently as possible requested content (data, service, product) to client devices. One explored approach to improve existing content provider systems is to switch from a static interfacing between content provider systems and client devices, where the user statically input requests to a more dynamic and transparent interfacing where the requests of the users are anticipated or derived by transparently capturing context derived from user actions on the client device.

In a web based client/server architecture, it is known for example to capture the user context by exploiting "cookies", which are data that a Web server can store or read on a client device hard disk. However, cookies carry limited information that only enable content provider systems to collect general information about the user, which still requires a static interfacing between the content provider system and the user device. They are further limited to a browser context and are not adapted to the context of applications.

A dynamic interfacing between the content provider system and the user device is desirable to reduce the number of actions that a user needs to perform on an interface to access a content (such as information or a service), as well as the time spent by a user to access a service or content.

Existing content provider systems enable reception of client requests via a dedicated user interface through which a number of user clients can directly access and statically enter a request for a service or content. The content handled by the content provider system may be received from content provider systems communicating with the content provider system, in response to requests input by a user on the dedicated user interface. This requires the user to pause a current action when he wishes to access service or content, to log in to the content provider system, to enter the parameters of his request and the different options related to the desired service or content, the parameters being required to be structured according to the format prescribed by the content provider system.

For example, the content provider system may be a travel provider system which determines the best journey options in response to a user request for a travel, the user specifying on a user interface a date, departure/arrival geographical locations, and optionally user preferences (cost criteria, connections, etc.) if the user wishes to travel at optimized costs. The user is thus required to pause his/her current action (for example in a business context, he may have to pause a current business task) to statically access the dedicated user interface of the travel provider system, enter the travel parameters, validate the travel request, log in to the user account, etc. When all these cumbersome operations have been completed, he can access to travel information and/or directly perform travel booking to book a journey and possibly auxiliary services (e.g. car rental or hotel booking).

However, it often happens that users forget or do not find time to perform such bookings early, in particular in a business context where they tend to prioritize their main business activities. As a result, they cannot benefit from the best service at best cost or with best travel options.

More generally, users are willing to spend as little time as possible to access content or services delivered by content provider systems. The success of modern content provider systems can depend on the time needed for a user to efficiently access or to purchase a service, and more generally on the optimization of the user experience. For example, a user might be detracted from using a content provider system because of the time needed to access to the dedicated interface of a content provider system.

Improved systems, methods, and computer program products for dynamic content delivery are accordingly needed that obviate the need for a user to actively access to the dedicated application interface of a content provider system while optimizing the interaction between the user and the content provider system.

SUMMARY

In order to address these and other problems, there is provided a system for dynamically delivering content from a content provider system to a user device, the content provider system being configured to deliver content in response to a request having one or more predefined formats, the user device comprising an application executing on the user device, the application being associated with an application interface, the application being configured to receive input data from at least one user through the application interface, the input data comprising a set of data items, each data item having a type and a value, wherein the application may comprise an executable application extension. The system further may comprise a bridging device, the bridging device being configured to dynamically connect the application to the content provider system during execution of the application extension, the application extension being configured to activate a connection to the bridging device, in response to the detection of an activation condition, the application being configured to transmit at least some of the data items comprised in each input data block to the bridging device during the connection to the bridging device, the bridging device being configured to generate a request for content according to one of the predefined request formats using the data items received from the application and to transmit the request to the content provider system.

In one embodiment, the bridging device may comprise:
a parser configured to parse a set of reference values for each request parameter, in response to the receipt of an input data block;
a mapper configured to determine if at least some of the reference values of the set of reference values map a data item in the input data block or in one or more auxiliary sources, the mapper being further configured to associate an elementary scoring to each data item mapping a reference value.

In one embodiment, each reference value may be associated with a list of auxiliary values, the mapper being configured to determine a mapping between a reference value and a data item in the input data block or in one or more auxiliary sources, if the data item in the input data block or in one or more auxiliary sources maps one of the auxiliary values.

The bridging device may comprise:
a request generator configured to generate a content request based on the elementary scorings associated with the data items mapping the reference values, the request comprising request parameters, each request parameter being associated with one or more reference values, the value of at least one of the request parameter being derived from a reference value mapped to a data item and associated with the request parameter depending on the scoring determined for the reference value;

the bridging device being further configured to send the request to the content provider system.

In one embodiment, the value of a request parameter may be determined from the reference value having the highest scoring.

The bridging device may be configured to determine the value of the request parameter using a function defining a relationship between the value of the request parameter and the reference value.

In one embodiment, the bridging device may further comprise a converter configured to convert the format of a reference value into the format of the request parameter associated with the reference value.

In some embodiments, the application may be associated with a data memory configured to store the data items.

In some embodiments, the application may comprise a user data memory configured to store a user identifier, the application extension being configured to transparently and securely transmit the user identifier to the bridging device, the bridging device being configured to control the access of the user to the content provider system using the user identifier.

The bridging device is configured to receive content from the content provider system in response to the request, the bridging device being configured to transmit the content to the application, the application comprising a rendering unit for rendering the content in a dedicated area of the application interface.

In one embodiment, the rendering unit may be configured to dynamically adjust the dimensions of the application as a function of the content transmitted by the bridging device.

there is provided a system for dynamically delivering content from a content provider system to a user device, the content provider system being configured to deliver content in response to a request having one or more predefined formats, the user device comprising an application executing on the user device, the application being associated with an application interface, the application being configured to receive input data from at least one user through the application interface, the input data comprising a set of data items, each data item having a type and a value, wherein the application may comprise an executable application extension. The system further may comprise a bridging device, the bridging device being configured to dynamically connect the application to the content provider system during execution of the application extension, the application extension being configured to activate a connection to the bridging device, in response to the detection of an activation condition, the application being configured to transmit at least some of the data items comprised in each input data block to the bridging device during the connection to the bridging device, the bridging device being configured to generate a request for content according to one of the predefined request formats using the data items received from the application and to transmit the request to the content provider system.

In one embodiment, the bridging device may comprise:
a parser configured to parse a set of reference values for each request parameter, in response to the receipt of an input data block;
a mapper configured to determine if at least some of the reference values of the set of reference values map a data item in the input data block or in one or more auxiliary sources, the mapper being further configured to associate an elementary scoring to each data item mapping a reference value.

In one embodiment, each reference value may be associated with a list of auxiliary values, the mapper being configured to determine a mapping between a reference value and a data item in the input data block or in one or more auxiliary sources, if the data item in the input data block or in one or more auxiliary sources maps one of the auxiliary values.

The bridging device may comprise:
a request generator configured to generate a content request based on the elementary scorings associated with the data items mapping the reference values, the request comprising request parameters, each request parameter being associated with one or more reference values, the value of at least one of the request parameter being derived from a reference value mapped to a data item and associated with the request parameter depending on the scoring determined for the reference value;
the bridging device being further configured to send the request to the content provider system.

In one embodiment, the value of a request parameter may be determined from the reference value having the highest scoring.

The bridging device may be configured to determine the value of the request parameter using a function defining a relationship between the value of the request parameter and the reference value.

In one embodiment, the bridging device may further comprise a converter configured to convert the format of a reference value into the format of the request parameter associated with the reference value.

In some embodiments, the application may be associated with a data memory configured to store the data items.

In some embodiments, the application may comprise a user data memory configured to store a user identifier, the application extension being configured to transparently and securely transmit the user identifier to the bridging device, the bridging device being configured to control the access of the user to the content provider system using the user identifier.

The bridging device is configured to receive content from the content provider system in response to the request, the bridging device being configured to transmit the content to the application, the application comprising a rendering unit for rendering the content in a dedicated area of the application interface.

In one embodiment, the rendering unit is configured to dynamically adjust the dimensions of the application as a function of the content transmitted by the bridging device.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide a system and a method for dynamically delivering content in a computer environment.

Figure 1:
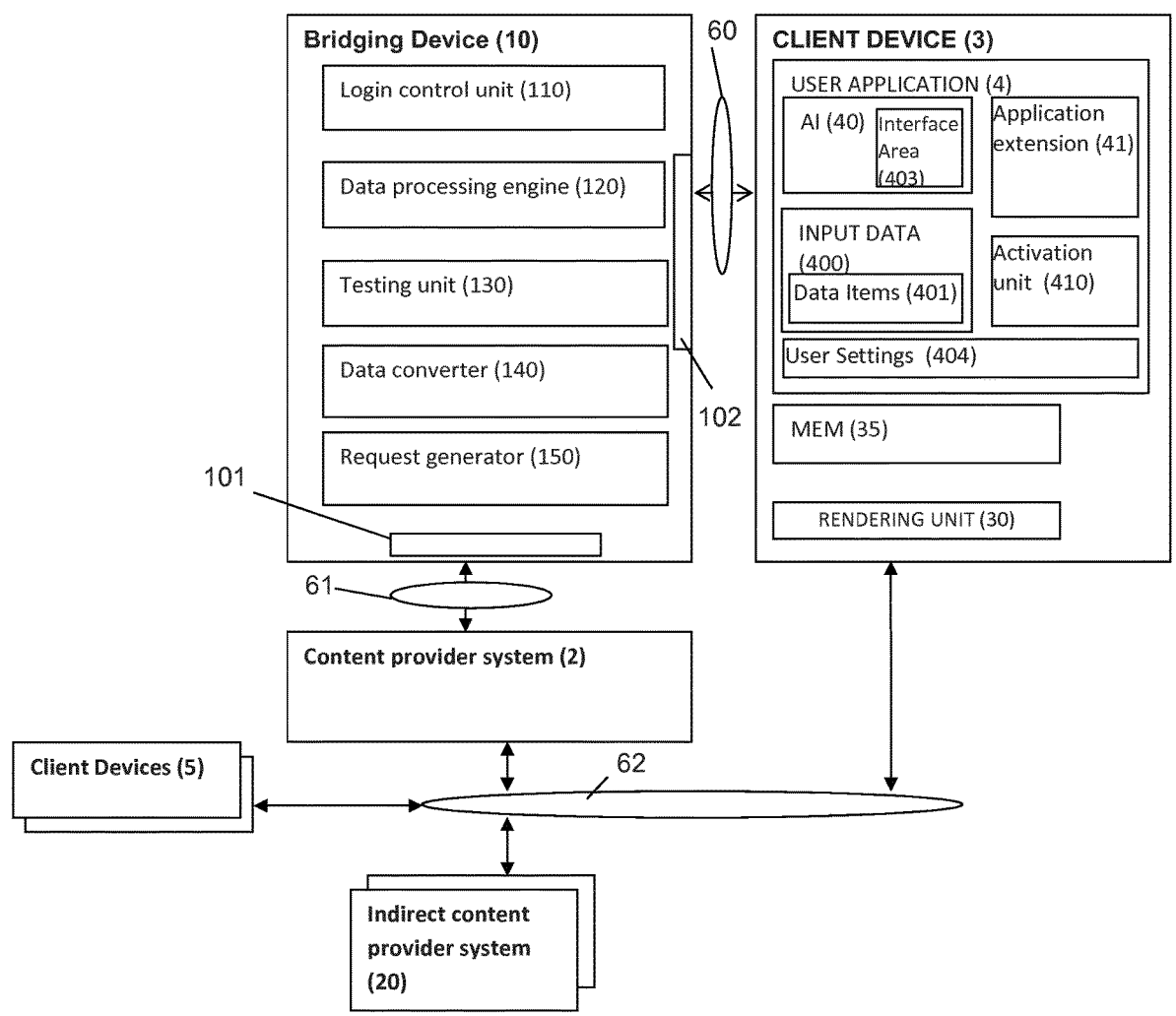
FIG. 1 is a diagrammatic view of a dynamic content delivery system, according to some embodiments.

With reference to FIG. 1, an example operational environment of a dynamic content delivery system 100 is shown, according to some embodiments.

The dynamic content delivery system 100 may be implemented to dynamically deliver content generated by at least one content provider system 2 to a user device 3 from data captured in an application 4 running (or executing) on the user device 3, through a bridging device 10.

The content provider system 2 may be any system configured to directly deliver content to one or more user devices 5 in response to user requests, via a communication network 62, or indirectly through the bridging device 10 to a user device 3 executing a given application 4, via a communication network 60. In one embodiment, the content provider system 2 may host one or more websites and/or have a hosting service host one or more websites.

As used herein, the term "content" refers to any content that may be delivered to a user device through a computer system, such as data, products, services, which encompasses not only electronic text but also images, pictures, audio recordings, and other data forms which can be processed, stored, and returned in electronic form to a user device through a user interface.

Each client device 3, 5 (also referred to hereinafter as a "user device") may be a personal computing device, a tablet computer, a thin client terminal, a smartphone, and/or other such computing device. Each client device 3, 5 may host web browsers and/or custom applications software (e.g., a client system) and may include a client user interface.

Each user device 3, 5 may further include a web-browser application that communicates with a web-server application hosted by the content provider system 2. Such web-server application may, in turn, communicate with indirect content provider systems 20 via a dedicated network 62 to enable the content provider system 2 to indirectly deliver the content supplied by such "indirect" content provider system 20 to user devices 3, 5.

The user device 3 may be any suitable computing system configured to execute an application 4 associated with an Application Interface 40 (also referred to hereinafter as "AI"), through which a user can input or receive data. The data 400 input into the application by the user or received by the user (generally referred to as "input data") may be stored into a data memory of the application 4.

A user operating one of the user devices 3, 5 may directly interface with the content provider system 100 using the user devices 3, 5 during a service request session related to an application (for example accessed by connecting to a web service). The content provider system 2 may store a user account if the user is already registered, or alternatively may comprise no data related to the user if the user has not previously created a user account.

The content provider system 2 may be dedicated to one or more specific service fields (for example, the travel field or the real-estate field). While each user device 5 may connect to the communication network 62 to conventionally enable initialization of a content request session by a user with the content provider system 2 and reception of the requested content from the content provider system 2 in response to the content request, the user device 3, according to embodiments of the invention, may access such content transparently. More specifically, the user device 3 may transparently access content from the content provider system 2 in response to data received by an application 4 running on the user device 3, the user device 3 being connected to the bridging device 10 through communication network 60. The data received by the application 4 may comprise:

data input 400 by a user during the application execution through the application user interface 40 and/or data received by the user; such data may be stored in data memory 400 and/or auxiliary data which may comprise data related to the user and/or to the current context of the application also referred to application contextual data (such as for example if the user is accessing a Client card comprising data such as a client address and client contact information); such data may be maintained in one or more auxiliary sources such as for example in a memory 35 (for example user location or profile) or in user settings 404 (user preferences defined for the application).

The bridging device 10 may interact with the application 4 to capture the input data 400 and determine if a user request can be extrapolated using the input data 400 and/or auxiliary data, according to one or more predefined request formats supported by the content provider system 2. Each request is defined by at least a set of request parameters representing the inputs of the request. The request parameters are structured according to the format prescribed by the content provider system 2.

If the bridging device 10 can extrapolate a request from data captured from the application and/or the auxiliary data, the bridging device 10 may be configured to generate a request, the fields of the request being filled with values determined by the bridging device 10 from the input data 400, and possibly from the auxiliary data (such as the user data stored in memory 35 or user settings 404). The bridging device 10 may thus transmit the request to the content provider system 2.

To determine the request parameters, the bridging device may map (or associate) each request parameter with a data item of the input data 400 and/or of the auxiliary data. In some embodiments, each mapping between a request parameter and a data item may be further assigned a scoring which may be used to generate the request.

In one exemplary application of the invention to a travel provider system implemented as a web server and configured to deliver travel proposals (for pre-booking or booking) in response to travel requests, the predefined format of a request generated by the bridging device may comprise the following request parameters:
- departure location/date/time parameters;
- arrival location/date/time parameters;
- additional travel related parameters.

The request parameters may include "mandatory" or "optional" request parameters, the mandatory request parameters being required by the content management system to be able to process the request. The optional request parameters may include for example the user preferred language, or request refining parameters (e.g. time of day, preferred company).

The content provider system 2 may deliver content to the user device 3, either directly or through the bridging device 10, in response to the generated request.

Embodiments of the invention may be implemented by a computing system comprising one or more networked computers or servers. The computing system may provide processing and database functions for content provider.

The content provider system 2 may host one or more websites and/or have a hosting service host one or more websites.

The application 4 may comprise an executable application extension 41 (also referred to as an application "plugin", "addin" or "extension software component") configured to add a dynamic content delivery feature to the application 4. The application extension 41 may be statically or dynamically activated within the application 4, when the application is launched.

The application interface 40 may have a configuration customized depending on the application 4 and may be dynamically updated depending on the execution of the application 4 and of the application extension 41, when such extension is activated. The application interface 40 may be rendered on a rendering unit 30 of the user device 3 such as a User Interface (for example Graphical User Interface) and may comprise different types of graphical elements, such as windows, text input fields, icons, selectable elements, graphical control elements such as drop-down menus or list box, activation buttons, etc. The rendering unit 30 will be referred to as a user interface for illustration purpose.

The data 400 received through the application interface 40 may comprise a set of data items 401. Each data item may be defined by a value having a type (string, character, number, etc.) and optionally a data format (date format, time format, etc.). A data item may further belong to a data category (e.g. location, date, time, etc.). In some embodiments where the data input by the user in the application interface are structured such as in an event management tool, the data item may further have a typology (for example event start time date, event location, etc.).

In some embodiments, the data items input into the application 4 may be structured according to a dependency graph, each data item being represented by a name and a value, or more generally according to a data representation format.

The user device 3 may comprise an interface manager (not shown) for generating display of information on the user interface 30, the interface manager dynamically generating a display of the application input interface 40 depending on the execution of the application 4 and the activation of the application extension 41.

The application 4 may be any application adapted to receive data through the application interface 40 and support an application extension 41. For example, the application 4 may be a communication application through which a user can communicate through a messaging interface with another user, such as a messaging application (e.g. email application) or a social networking application (e.g. FACEBOOK, TWITTER, etc.). The application may be also an organizer application such as a calendar or a dashboard, or a desktop application (such as a Text Processing application for example). The application may comprise a unique tool or provide a set of tools (such as a messaging application tool, a meeting management tool, and a calendar management tool). If the application comprises several tools, the user access to one tool of the application 4 may trigger dynamic content delivering.

It should be noted that although the invention has particular advantages for input data 400 of text type, in some embodiments the input data 400 may include any type of data that can be analyzed and interpreted by the bridging device 10 such as voice type data, image type data, or a combination thereof.

The application 4 may be located internally (e.g. desktop software application pre-installed on the user device) or externally to the user device and/or distributed among multiple computers (e.g. client-server software application, such as a web application). The application 4 may be alternatively provided as a service over the network, such as a cloud computing service.

The user device 3 may be configured to communicate via the network 60 for executing the application 4 if the application is a client-server application or an application provided as a cloud computing service.

Each communication network 60, 61, 62 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. Each communication network 60, 61, 62 may use standard communications technologies and/or protocols such as 4G, Ethernet, 802.11, TCP/IP (Transmission Control Protocol/ Internet Protocol, HTTP (Hypertext Transport Protocol), FTP (File Transfer Protocol), etc. Data can be exchanged over each network 60, 61, 62 according to different data exchange technologies and/or formats such as the hypertext markup language (HTML) and the extensible markup language (XML).

The bridging device 10 may comprise a first interface 101 for interacting with the content provider system 2 through the network 61 and a second interface 102 for interacting with the application 4 running on the user device 3 through the network 60.

Initially, a user may launch the application 4 on the user device 3. The user may input data 400 ("raw data") at any time on the application interface 40 of the application 4 during the execution of the application, which changes the state of the application and may dynamically trigger an update of the display of the application interface 40.

The application 40 may comprise an activation unit 410 for activating the application extension 41. For example, such activation unit 410 may launch the application extension in response to a selection of a graphical element associated with the application extension 41 on the application interface 4, such as an activation button.

Alternatively, the user may predefine in the user settings 404 associated with the application 4 the automatic activation of the application extension 41, the activation unit 410 being then configured to automatically activate the application extension 41 at the launch of the application 4. In still another embodiment, the user may dynamically activate the application extension 41 in response to the detection of activation conditions. For example if the application is a meeting management tool, the application extension 41 may be automatically triggered if an invitation is received by the user for a meeting with a meeting location different from the user location as defined in his profile.

The bridging device 10 may include a logging control unit 110 to control the access to the bridging device 10 by a user of the application 4 using user identifier transparently received from the application 4 (persistent login).

The bridging device 10 may further comprise a data processing engine 120 for processing the data items 401 of each input data block 400 received from the application 4 and/or auxiliary data in order to infer the values of the request parameters and generate a request to be transmitted to the content provider system if a request generation condition is satisfied.

Each request parameter may be associated with a predefined list of reference values representing a set of possible values from which the value of the request parameter may be determined. A request parameter may have a typology (for example "departure location", "arrival location"), may belong to a data category (e.g. location, date), may have a data type (e.g. char) and/or a data format (e.g. IATA).

For at least some of the request parameters, the data processing engine 120 may be configured to parse one or more reference values associated with each request parameter.

The data processing engine 120 may be configured to determine if one or more reference values associated with a request parameter can be mapped to one or more data item of the input data 400. The data processing engine 120 may further determine an Elementary scoring (also referred to herein after as Elementary Trust Indicator or ETI) for each mapping determined between a reference value and a data item. Each reference value corresponding to a request parameter and mapping a data item represents a candidate value from which the value of the corresponding request parameter may be derived by a request generator 150.

The data processing engine 120 may further determine the value of one or more request parameters from the auxiliary data (user profile, user preferences, application contextual data, etc.).

The bridging device 10 may accordingly derive the value of a request parameter from the value a reference value associated with the request parameter which maps a data item of the input data block, depending on the elementary scoring computed for such mapping between a data item and a reference value.

The bridging device 10 may be configured to generate a request to the content provider 2 using the values determined for at least some of the request parameters if a request generation condition is satisfied. A request generation condition may be for example satisfied if a candidate value has been found for each "mandatory" request parameter.

An exemplary application of the invention to travel content delivery is now considered to illustrate the operation of the bridging device 10. For each request parameter (e.g. "departure location"), the data processing engine 120 may thus initially parse one or more predefined reference values associated with the request parameter, determine if the input data block comprises a data item (e.g. Paris) mapping the one or more reference values associated with the request parameter (e.g. CDG, Orly, London, . . . ). In one embodiment, the reference values may comprise possible values of the request parameters (for example location values in IATA format) or equivalent or synonymous values. The reference values may be parsed in a predefined order. The parsing of reference values for a given request parameter may be stopped depending on the number of mappings found between reference values associated with the request parameter and data items and/or on the scorings found for such mapping.

In some embodiments, the data processing engine 120 may only compare a data item with the reference values associated with the request parameter if the data item has the same category as the request parameter.

If a mapping is found between a data item of the input data block and one or more reference values associated with the request parameter being processed (e.g. data item "Paris" maps three reference values "ORLY", "CDG" and "Paris"), the data processing engine 120 may determine an elementary scoring ETI for each mapping between a data item and a reference value.

For each request parameter, the data processing engine 120 may select a mapping between a data item and a reference value associated with the request parameter depending on the elementary scorings determined for the different mappings {Data item/Reference value} found for the request parameter. In one embodiment, the elementary scoring may be determined from a semantic comparison between a data item and a reference value and/or additional data or rules available from the content provider system or from the application such as user profile, user preferences, etc.

In one embodiment, the data processing engine 120 may select for each request parameter the mapping between a data item and a reference value corresponding to the request parameter which has the highest scoring for example, the value of the request parameter being then derived from such reference value. For example, if the data item is "July $28^{th}$" having a date category and an "event start date" typology while the request parameter has a "departure date" typology and also belonging to the date category. "28/07/2017" (Reference Value 1) and "28/07/2018" (Reference value 2) are two reference values that map the data item "July $28^{th}$". Two mappings may thus be found by the data processing engine 120 between:

reference value 1 and data item "July $28^{th}$" (Mapping 1)
reference value 2 and data item "July $28^{th}$" (Mapping 2).

This provides two candidate values from which the value of the request parameter may be determined.

"Mapping 1" may be assigned a higher scoring than mapping 2 because reference value 1 is the closest date with respect to the current date. The data processing engine 120 may select "Mapping 1". However, the value of the request parameter ("departure date") will not be set exactly to the value of "reference value 1" because the data item has an "event start date" typology different from the typology of the request parameter. The data processing engine 120 may instead determine the value of the request parameter (departure date) from the selected reference value (Reference Value 1) using a computation function. Such reference values are thus linked to the corresponding request parameter by such computation functions, the value of the request parameter being thus a function of the value determined for the reference value.

Further, each request parameter may be dependent or independent of one or more other request parameters. Accordingly, the value of a request parameter may be not only a function of a corresponding reference value but also of the value of other request parameters. For example, the request parameter "arrival time" is dependent on the request parameter "arrival date".

The data processing engine 120 may comprise a parser for parsing the input data 400. In one embodiment, the bridging device 10 may be configured to dynamically receive the input data 400 as they are inputted by the user. In another embodiment, the bridging device 10 may be configured to dynamically receive the input data in response to a validation action by the user. A validation action may be for example triggered when a message is sent to another user or another system or device, if the application is a communication application, when a meeting is created by saving the meeting in a calendar application or tool.

The bridging device 10 may further comprise a testing unit 130 configured to determine if a request generation condition is met from the mapping performed between the data items and the reference values.

The request generator 150 may be configured to generate a request, if the request generation condition is met, the bridging device 10 being configured to send the request thus generated to the content provider system through the interface 101.

The request generator 150 may be configured to derive the value of the request parameter from the value of a reference value mapping a data item of the input data block or auxiliary data depending on the elementary scoring obtained for such mapping. The request generator may apply data structuring rules defined by the content provider system to derive the value of a request parameter such as rules defined by a standard (e.g. IATA). The derived value thus computed may be assigned to the corresponding request parameter. The request generator 150 may further take into account a relationship predefined between the request parameters to determine the value of a given request parameter. For example, considering a meeting management application 4, and a content provider system 2 of the type travel provider system, assuming that a data item value of event start date typology and another data item value of event start time typology were each mapped to a reference value (a reference value associated with the departure date request parameter and a reference value associated with the departure time request parameter) by the bridging device 10, the values of the request parameters "departure date" and "departure time" for a travel request may then be derived from the two reference values, using predefined computation functions or rules.

In some embodiments, the bridging device 10 may also comprise a data converter 140 configured to convert the data items mapped to the reference values into the corresponding request parameter format as defined by the content provider system 2, if the request generation condition is met, prior to the generation of the request.

In operation, the user may thus access to the content provider system 2 or interact with it using the application interface 40 instead of directly using the interface of the content provider system without a need to actively specify a request for content from the content provider system 2.

As the application is being executed and the application 4 is receiving data, the bridging device 10 may dynamically generate requests in response to the data transmitted from the application 4. The content provider system 2 may comprise a search engine configured to process requests received according to a suitable communication protocol (such as HTTP protocol for example), the requests having one format among the predefined request formats supported by the content provider system 2. In response to requests received from the bridging device 10, the content provider system 2 may trigger a search by its search engine to determine if results exist that satisfy the request.

On the application side, data received from the user or derived from the context through the application interface 40 may be continuously gathered and transmitted to the bridging device 10 until the bridging device collects sufficient information to generate a request for content (for example for a product or for data).

The application interface 40 may comprise an interface area 403 (schematically shown in FIG. 1) dedicated to the application extension 41. The interface of the dedicated area 403 may dynamically change as the user inputs data on the remaining part of the application interface, as a result of the processing performed by the bridging device 10. In some embodiments, the form and/or size and/or the display mode of the area 403 may be dynamically changed depending on the results returned by the bridging device 10 and/or on whether a user action is detected in the area 403. In one embodiment, the bridging device 10 may return a reliability flag to the application to control the display mode of the interface area 403. The interface area may be displayed within the same window as the application interface or in a separate window (pop-up window) for example. The reliability flag may be computed by the bridging device 10 as a function of the scorings determined for the mapping between data items and reference values.

The bridging device 10 may for example enable purchase of a product or a service by the user by determining if the data received by the application match at least some of the predefined parameters of a request, corresponding to one of the request formats predefined by the content provider system.

If the search engine of the content provider system 2 determines that content (e.g. one or more products) exists that matches the request received from the bridging device 10, the content provider system 2 may return a response comprising the search results satisfying the request (for example product offers) to the application 4 through the bridging device 10. The application extension 41 may generate a display of the results in the dedicated area 403 of the application interface 40 or alternatively redirect the user to the Internet Domain of the content provider system 2 by opening a pop up window to enable the user complete its access to the content (for example to purchase one or more products). Alternatively, the application extension 41 may be associated with a dedicated portion of the application interface on which the user can access to the results satisfying the request (for example product offers) and may select one or more results, which may redirect the user to the interface of the content provider system 2 to complete to access to the content (data, service) such as for example to complete a product purchase transaction.

The application extension 41 may comprise a redirection function to redirect the user to the content provider system 2 through a dedicated application installed on the user device 3 or through the Internet Domain of the content provider system 2 using the associated URL, in response to a selection made by the user.

For example, the bridging device 10 may send the request to the content provider system 2 using a URL of a predefined type which may comprise a set of fields such as:
  a Body;
  the content provider system identifier field such as a Chain field;
  fields related to the request parameters (name/value pairs) as determined by the bridging device 10 which may include further the language detected by the bridging device 10 (for example US language).

The skilled person will readily understand that the invention is not limited to such specific fields in the request URL and may include different fields depending on the application of the invention.

More generally, the request URL may match one of a plurality of URLs types defined by the content provider system depending on the Domain Name System hierarchy (for example per brand, per geographical region). Each type of URL may comprise a set of fields, each comprising one key and one value.

Figure 2:
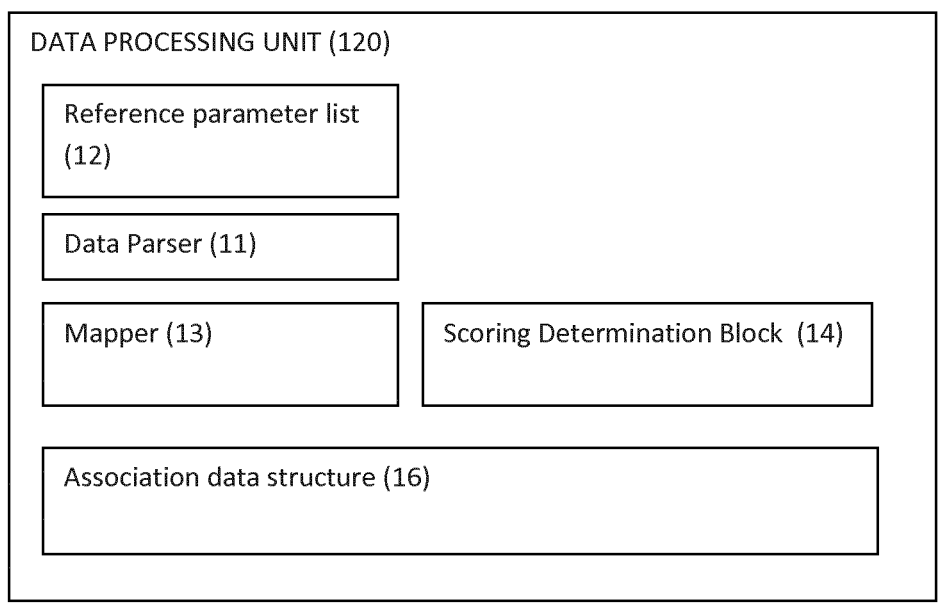
FIG. 2 is a diagrammatic view of a bridging device, according to some embodiments.

FIG. 2 is a block diagram of the data processing unit 120 according to some embodiments.

The processing unit 120 may comprise:
  a predefined list of reference values 12 comprising the list of reference values for which a mapping is found by the bridging device 10 in response to the receipt of an input data block from the application 4;
  a data parser 11 configured to parse the input data block;
  a mapper 13 configured to determine if at least one reference value of the list 12 can be mapped to one or more data items of the input data block and/or data from one or more auxiliary source of data (user preference, user setting, user profile, etc.); the mapper 13 may implement one or more search algorithms adapted to the data structures supported by the application 4 including optimized search algorithms to limit the search space;
  a scoring determination block 14 configured to determine an elementary scoring ETI for each mapping determined between a reference value and a data item;
  an association data structure 16 configured to store each reference value with the mapped data item, and possibly the associated scoring, for each mapping between a reference value and a data item.

Embodiments of the invention may be implemented by a computing system comprising one or more networked computers or servers. The computing system may provide processing and database functions for content provider.

Figure 3:
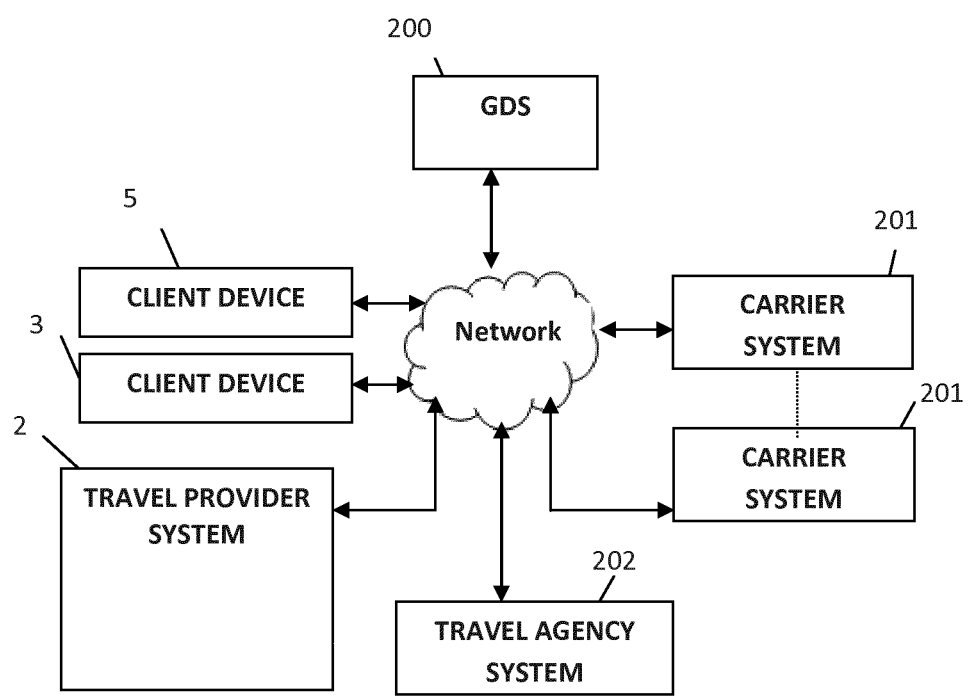
FIG. 3 shows a travel provider system according to one exemplary embodiment.

Referring now to FIG. 3, an exemplary operating environment 300 in accordance with an embodiment of the invention in which the travel provider system 2 is a booking system. The travel provider system 2 may be configured to determine travel proposals in response to a request and enable booking of a travel or travel related services in response to a selection of a proposal by a user, either directly if the travel provider system or indirectly. The environment 300 may include a Global Distribution System (GDS) 200, one or more indirect product provider systems 20, such as carrier systems 201, one or more travel shopping or indirect seller systems (auxiliary content provider systems), such as a travel agency system 202, the travel provider system 2, and one or more client devices 3, 5. Each of the GDS 200, the carrier systems 201, the indirect seller system 202, the travel provider system 2, and the user device 3 or 5 may communicate through a network 62. The carrier systems 201 may each include a Computer Reservation System (CRS) and/or billing system for the respective airline that enables the GDS 200 and/or indirect seller system 202 to reserve and pay for airline tickets. The carrier systems 201 may also interact with each other, either directly or through the GDS 200, to enable a validating carrier to sell tickets for seats provided by an operating carrier. The operating carrier may then bill the validating carrier for the services provided.

The GDS 200 may be configured to facilitate communication between the carrier systems 201 and indirect seller systems 202 by enabling travel agents, validating carriers, or other indirect sellers to search for available segments and book reservations on one or more carrier systems 21 via the GDS 200. To this end, the GDS 200 may maintain links to each of the carrier systems 201 via the network 62. These links may allow the GDS 200 to obtain scheduling and availability data for segments from the carrier systems 201, and travel proposal reservation requests to the carrier systems 201. The carrier and travel agency systems 201, 202 may thereby book flights, trains, or other types of segments on multiple carriers via a single connection to the GDS 200. The GDS 200 may store and/or maintain a Passenger Name Record (PNR) that includes a complete set of data for an itinerary of a trip, including segments from multiple carriers and/or other travel services comprising the trip such as hotel and rental car reservations.

A travel agency system 202 may include a web server that provides a publicly accessible website. This website may be configured to provide access to travel planning features, such as the ability to search for travel products matching a travel request. To this end, the travel agency system 202 may provide the traveler with access to data from one or more databases hosted by the GDS 200, carrier systems 201, travel agency system 202, and travel planning system 203. In an alternative embodiment of the invention, the travel agency system 202 may be a proprietary system that limits access to travel service providers or travel agents, in which case access may be provided through a private website or other application.

The travel provider system 2 may be in communication with the travel agency system 202 via the network 62 or some other suitable connection. In alternative embodiments of the invention, all or a portion of the travel provider system 2 may be integrated into one or more of the other systems 200, 201, 202, 203. Travelers or travel agents may use the travel agency system 202 to generate and/or search for travel proposals that satisfy a travel request received from the traveler using the travel provider system 2.

The GDS 200, carrier systems 201, the travel agency system 202, the travel provider system 2, and the user devices 3, 5 of the operating environment may be implemented on one or more computing devices or systems, referred to collectively as a computer, such as computer.

Figure 4:
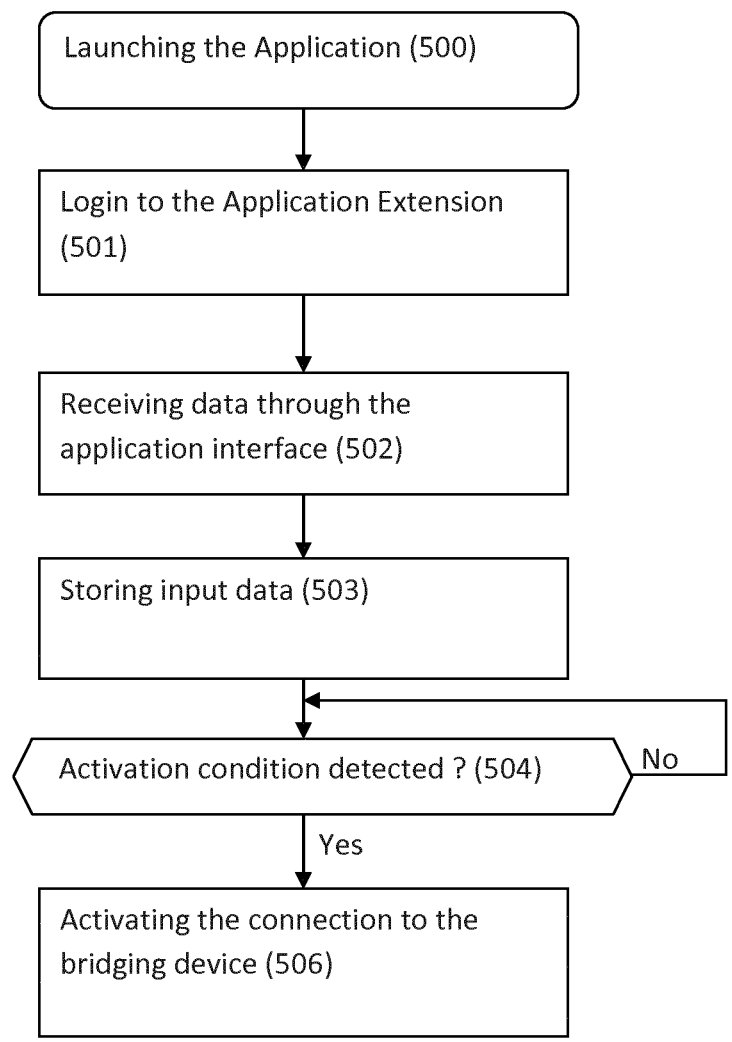
FIG. 4 is a flowchart illustrating the process of activating the bridging device, in accordance with an embodiment of the invention.

FIG. 4 is a flowchart depicting the process implemented by the application 4 to dynamically connect to the bridging device 10, according to one embodiment.

Initially, the application 4 is launched by the user (block 500).

In step 501, the user may log into the application extension 41. Alternatively, the user may automatically log into the application extension when launching the application, if automatic login has been activated.

In step 502, input data are received by the application 4 (e.g. security token, settings, language) either directly from the user or by validation of data received by the user (for example meeting invitation, attachment, etc.) through the application interface 40. The user may for example input the data using an input device such as a keyboard or a point device (e.g. mouse device) through the application interface. The input data may be for example textual data having a predefined data structure defined by the application 4. In some embodiments, such as a calendar or agenda application or a calendar or agenda tool of an application (messaging application), the application interface may comprise predefined fields, such as text boxes, each defined by a data pair comprising a name and a value. A text box may be displayed on the application interface in association with a name. The value of a text box may be entered or selected by the user or have a default value defined by the application or be automatically filled by the application 4 depending on user settings 404. For example, if the application comprises a calendar tool, the calendar comprises a set of calendar entries. A calendar entry may be created for an "event" (for example a "meeting"). When selecting a calendar entry, the user may be prompted to specify different fields (text boxes) including:

a subject-matter field;
a location field;
a start date field;
an end date field;
a start time field;
an end time field.

Each of the above fields may be defined by a data pair comprising a name and a value. The data input by the user may be structured according to a data structure predefined by the application 4, the data structure identifying the name/value pairs of the fields and relationships between the fields.

In step 503, the input data may be stored in the data input memory 400 of the application according to the data representation structure of the application 4. The input data may be stored as data blocks. In some embodiments, input data may be stored in the memory 400 when the user saves the input data by performing an action such as for example by selecting a saving button for a calendar entry or by sending a message, for a messaging application.

Each input data block stored in the input data memory 400 may comprise a set of data items 401, each data item having a data format and a value.

In step 504, the application extension (41) may determine if an activation condition is satisfied from the input data block.

In some embodiments, the activation condition may be satisfied in response to data received by the application 4. In an embodiment in which the application interface 40 comprises a set of text boxes defined by a name/value pairs, the activation condition may depend on the receipt of at least one value for one of the text boxes, for example as a result of a direct input by the user. In other embodiments, the activation condition may be satisfied in response to the reception of data by the user, or to validation of data received by the user or even to opening of a client record (in response to the opening of such client record, the bridging device may for example generate a request for a travel to visit the client in a close date such as the subsequent week). In another embodiment in which the application interface 40 comprises areas for input of plain text by the user (e.g.

messaging application), the activation condition may be satisfied in response to the input of text by the user. In embodiments in which the application 4 enables creation of entries (event, message), the activation condition may be satisfied in response to the creation of a new entry by the user (e.g. creation of a new message or event).

In step 506, the connection to the bridging device may be activated by the application extension 41, in response to the detection of the activation condition. The application 4 may then transmit at least some of the data items 401 comprised in each input data block 400 to the bridging device 10 during the activation of the connection to the bridging device 10.

Figure 5:
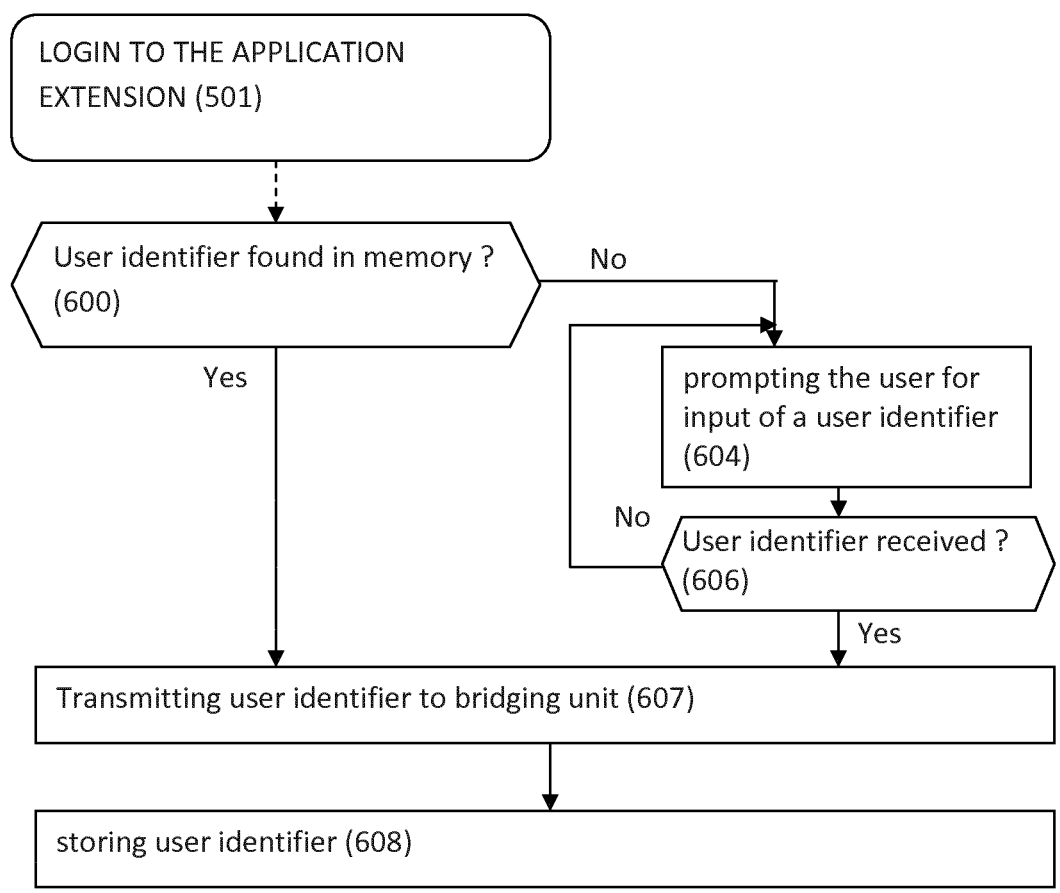
FIG. 5 is a flowchart illustrating the process of logging to the application extension, in accordance with an embodiment of the invention.

FIG. 5 is a flowchart depicting the process of persistent login of a user to the application extension (block 501 of FIG. 4).

In step 600, in response to the launch of the application extension, the application 4 may check if the application memory 35 comprises a user identifier such as a user credential or a security token to login to the content provider system 2.

If so, the authentication identifier may be transparently retrieved from memory area 35 in step 602 and sent to the bridging device 10 in step 610. The user identifier may be verified by the content provider 2 (transmission via the bridging device in step 607) and may be stored in memory 35 if it is valid in step 608.

Otherwise, if no user identifier is found in memory area 35 (for example because the user did not enter his/her identifier previously or was not able to store his/her identifier because memory area 35 was empty or insufficient), the application 4 may trigger the display of a login panel to prompt the user for input of a user identifier in step 604. If the user inputs a user identifier (606), the user identifier may be also checked by the content provider 2 (transmission via the bridging device in step 607) and stored in memory 35 if valid in step 608.

Figure 6:
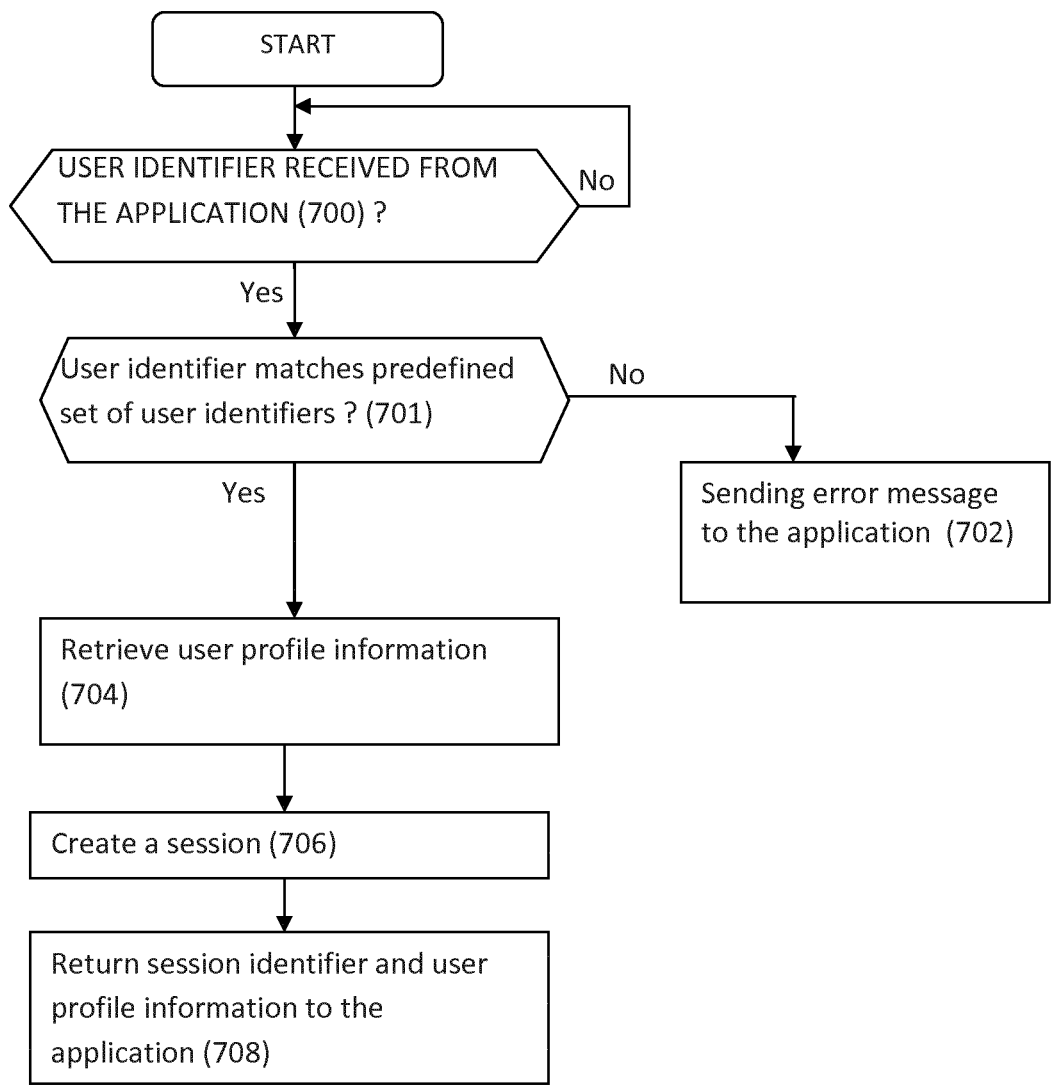
FIG. 6 is a flowchart illustrating the process of creating a session, in accordance with an embodiment of the invention.

FIG. 6 is a flowchart depicting the process of creating a session by the bridging device 10 to enable transparent access of a user of the application 4 to the content provider system in response to the receipt of the user identifier (step 607 of FIG. 5), according to one embodiment (block 700).

In step 701, the bridging device 10 may compare the user identifier received from the application 4 with a set of predefined authorized identifiers.

If the authentication identifier does not match the set of predefined authorized identifiers, the bridging device 10 may return a login error message to the application 4 in step 702 or alternatively create a profile for the user. The application 4 may trigger a display of a login panel to prompt the user to enter his or her user identifier (similarly to step 604 of FIG. 5).

In response an authentication identifier received from the user, in step 704, the bridging device 10 may retrieve information related to the user, such as for example user information related to the system/company/community to which the user belongs to, in order to validate or not validate the user access, without a need for extra inputs from the user (e.g. input of the community identifier, e-mail identifier).

In step 706, a session may be created (instance of the content provider system 2).

In step 708, a session creation message may be sent to the application 4 whereby the application 4 and the bridging device 10 may exchange data to generate requests to the content provider system 2. The bridging device may further send user profile information as retrieved in step 704 to the application for storage in the memory area 35.

The application may create a unique session identifier and/or a security token for secure exchange between the application 4 and the bridging device 10.

The memory area 35 may comprise an area 350 dedicated to the user in which the user identifier, and/or the user profile information (e.g. system/company/community), and/or the session identifier, and/or the security token may be stored. If the application 4 is a web application or a shared application, the application memory area 35 may be divided into one or more sub-areas, each sub-area being related to a user. In some embodiments, the memory itself 35 may be maintained in a server or a copy of the memory may be maintained on such server.

Accordingly, the login may be transparently performed on behalf of the user (persistent login) by the application 4 and the bridging device 10.

Figure 7:
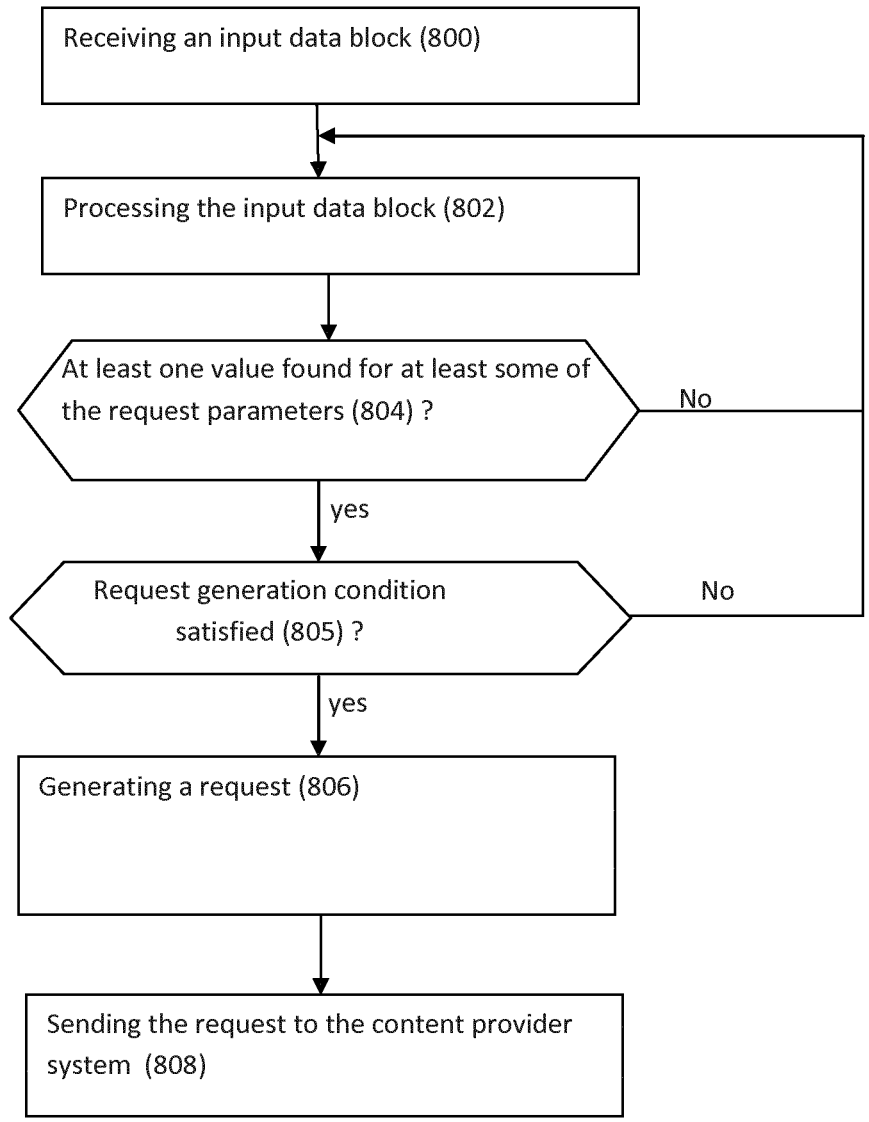
FIG. 7 is a flowchart illustrating a content delivery method, in accordance with an embodiment of the invention.

FIG. 7 is a flowchart depicting the process of generating a request at the bridging device 10 from data received from the application 4, according to some embodiments.

During a session, the bridging device 10 may be configured to dynamically exchange with the application 4.

As the user inputs data to the application through the application memory, the application 4 may store the input data in a structured way into memory 35.

In response to the detection of an activation condition (corresponding to step 504 of FIG. 4) related to the input of a new data block by the user through the application interface, the application may send the data block to the bridging device 10. In one embodiment, the application may send the input data block "as is" without prior processing. Alternatively, the application 4 may return at least some of the data items of the input data block to the bridging device with or without pre-processing. If no data is available at the application 4 (no data has been input by the user), the application 4 may send an empty value to the bridging device 10 periodically until data is input by the user into the application 4.

In step 800, the bridging device thus receives a data block from the application 4, the data block comprising a set of data items.

In an exemplary implementation of the invention using an email messaging application 4 comprising a set of tools and a travel provider system 2 configured to determine travel proposals in response to travel requests such as a departure date/location, and/or an arrival date/location, the following steps may be for example performed:
- if the user is creating or has received a Calendar entry in the email messaging application 4, the data block returned to the Bridging Device 10 may include a set of data items comprising a value for one or more fields among a Title, Location, Attendees (e-mail and name), Start date and time (with time-zone), end date and time (with time-zone) fields;
- if the user is creating or receive an E-mail entry, the data block returned to the Bridging Device 10 may include a set of data items comprising meeting related data which may comprise similarly a value for one or more fields among a Title, Location, Attendees (e-mail and name), Start date and time (with time-zone), end date and time (with time-zone) fields;
- If the user is creating a Client card, the data block returned to the Bridging Device 10 may include a set of data items comprising a value for one or more fields among a Client address, a client name, a client billing reference;
- If the user is writing an email, the data block returned to the Bridging Device 10 may include a set of data items comprising a value for one or more travel related fields derived from the user text and/or attachments included in the email such as location/access information. The bridging device 10 may further use one or more auxiliary source of information such as data available in the Application 4 (not necessarily in a calendar entry, email, or client card). For example, the user profile or settings information in the application (e.g. User language, location/access information, skin or CSS values) may be used by the bridging device 10.

In step 802, the bridging device 10 may analyze and process the input data block received from the Application (FIG. 3) or auxiliary data to determine if they comprise data items that match one or more reference values associated with each request parameters.

The reference values may comprise possible values of the request parameters. In some embodiments the reference values may further comprise equivalent values included in the lexical field of these possible values and/or synonyms of the possible values. In step 802, the bridging device 10 may apply different data processing techniques such as data parsing, data tokenizing, data filtering, data stemming, etc. taking into account the data structure of the application 4 to determine if a reference value matches one or more data items of the input data block and/or auxiliary data.

If a match is identified between a data item and a reference value, the reference value is paired (or mapped) with the data item.

The method may further comprise determining an elementary scoring ETI for each data item/reference value pair if a mapping has been found between the data item and the reference value, in the processing step 802. The scoring may be a value determined for the pair {reference value/data item} and indicating the level of relevance of the match between the reference value and a data item, the higher the value of the scoring, the better the relevance. If no mapping is found for a reference value, a zero value may be assigned to the scoring.

For example, in an application of the invention to travel providing, a mapping between a data item and a reference value may be considered relevant if:
- the value is lexically equivalent (e.g. IATA PAR and Paris, France are equivalent),
- travel-wise for the traveler (e.g. airport CDG is more relevant for a flight request than the SNCF train station code FRCDG), and
- comfort/cost-wise (e.g. flying to CDG instead of ORLY will be more comfortable for the traveler and any additional cost to the company—such as taxi—is justified).

Each pair of data item/reference value may be thus associated with an Elementary Trust Indicator ETI. An exact match may for example correspond to a maximal ETI value.

In some embodiments, machine-learned data may be used in step 802 to determine the ETI, such as a lookup table storing triplets of data, each triplet including a data item, a reference value and a pre-computed ETI value for the data item/reference value pair.

If at least one mapping has been determined between a data item of the input data block and a reference value with a non null ETI value, the value of the request parameter may be derived from the reference value depending on the ETI scores obtained for the different mappings between the reference values corresponding to the request parameter and data items. For example the mapping having the highest scoring may be selected and the value of the request parameter may be derived from the reference value corresponding to the selected mapping. The reference value selected to generate the value of the request parameter may be previously converted into the format or the data structure supported by the content provider system for this request parameter.

When at least some of the request parameters have been processed, the method may determine if a request generation condition is satisfied from the ETI values assigned to each pair of reference value/data item in step 805. Otherwise, the process may wait for a new input data block from the application.

If the request generation condition of step 805 is satisfied, a request may be generated in step 806, the request comprising values for at least some of the request parameters, each request parameter being assigned a value derived from to the data item paired with a reference value that is associated with the request parameter depending on its associated scoring ETI.

In step 808, the request may be sent to the content provider system 2, for example using a URL if the content provider system is a web server.

If the condition of step 805 is not satisfied, the method may wait for a new data block input from the application 4 to proceed. An error may be displayed in the application interface.

The response of the content provider system 2 to the request sent by the bridging device 10 may be displayed in the interface area 403 of the application interface dedicated to the application extension 41. The user may select an item of the display related to content provider instance, which may trigger an update of the display through the bridging device or a redirection to the content provider system interface.

For example, considering the example of a travel provider system 2 delivering travel proposals in response to travel requests and an application 2 of the type calendar, the input data block may comprise data items related to an event, such as at least a location, event start/end dates and times, while the standard request parameters include a departure location, date, time and/or an arrival location, date and/or time.

In such example, the value of a request parameter may be derived from a reference value using computation rules as follows:

The departure date and time request parameters of the request may be defined as the event start date/time (reference values) minus a predefined value (e.g. 24 hours).

The return date and time request parameters may be defined as the event end date (reference value) plus a predefined value (e.g. 4 hours).

In still another example, the departure date and time request parameters may be defined as the event start date/time (reference value) minus the time needed to access to the event from the user departure location to event location, which may include the sum of the average times needed for a user to:

reach the airport from your departure point (taken from historical and profile data);
pass security and flight control at departure point;
fly from departure to arrival locations;
pass security and flight control at arrival point; and
reach the event location from the arrival port (including car rental average time).

Similarly, the return date and time parameters of the request may be defined as the event end date/time (reference value) plus the time needed for the user to go back to the user location from the event location which may include the sum of the average times needed for a user to:

reach the airport from the event location (including estimated car rental return average duration);
pass security and flight control at departure point.

In one embodiment of the invention, the bridging device 10 may further trigger creation of one or more calendar or agenda entries into the application, if the application 4 is a Calendar/Agenda application or comprise a Calendar/Agenda tool (such as a messaging application), and if a request is generated by the bridging device 10 and the user validate a travel proposal and possible complementary services delivered by auxiliary content providers through the content provider system (2), such as for example hotel reservation, car rental in the example of a content provider system 2 delivering travel proposals (travel provider system).

In the example of a travel provider system 2, considering the example of an application 4 comprising a Calendar or Agenda tool (such as a messaging application) comprising calendar/agenda entries, if a user books one of the proposals (trip) and additional services returned by the travel provider system through the bridging device 10, the bridging device may thus dynamically create the following exemplary calendar entries may be generated for this trip event:

a reminder entry to head to departure port. A reminder may be for example generated to prompt the user to start heading to the airport. This event may be generated a predefined amount of time before the first segment in a bound (e.g. 2 hours before the flight departure). The relevant port data may be associated with instructions and advice;
a reminder entry for Flight/Rail check-in: such reminder may be generated a predefined amount of time before the first flight segment (e.g. 24 hours before the first flight). The check-in link to the airline can be included, as well as relevant trip information to ease the check-in (e.g. the Reservation number);
an entry for Flight/Rail segments: such entry may indicate each segment of a user trip, the start and end times of the trip being those of the flight segments. Flight details and relevant information may be included (such as a Terminal information, airport/train-station information, duration, flight/train numbers . . . );
entries for a Hotel reservation: two entries may be created for each hotel reservation, one for the "check-in" event and another one for the "check-out" time. Hotel details and relevant information may be included (e.g. Address, reservation info . . . );
Entries for car-rental reservation: two entries may be created for each car-rental reservation including a pick-up event and a drop-off event. The car rental details and relevant information may be included (e.g. Car-rental provider, Pick-up location address, reservation information, etc.).

The bridging device 10 may further create one or more entries into one or more other applications running on the client device 3 (different from application 4), such as for example in a GPS social navigation application (GPS stands for Global Positioning).

Figure 8:
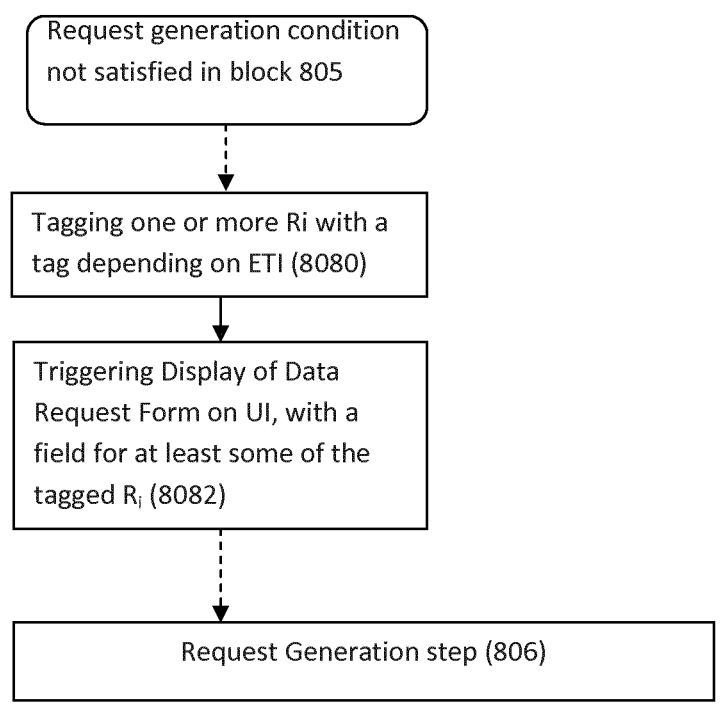
FIG. 8 is a flowchart illustrating the process implemented by the bridging device if a request generation condition is not satisfied, in accordance with an alternative embodiment of the invention.

FIG. 8 is a flowchart depicting the process of generating a request (step 808 of FIG. 7) according to another approach. Instead of waiting for new data block input, if the request generation condition is not satisfied in step 805 of FIG. 7, the bridging device 10 may alternatively send a message to the application 4 in order to have the application extension 41 generate a display of a request form comprising to prompt the user to input values for at least some of the reference values as depicted in FIG. 8.

Accordingly, if it is determined that the request generation condition is not satisfied based on the Elementary Trust Indicators determined for each reference value, in step 8080, one or more reference values $R_i$ may be tagged with a tag depending on the ETI value associated with each reference value $R_i$. For example, the reference values which are associated with an ETI value lower or equal to a predefined threshold value may be tagged in step 8080. The tagged reference values may correspond to the reference values for which a mapping has been found with a data item of the input data block but with a low ETI value or for which no mapping has been found. In some embodiments, the reference values for which two or more candidate values (mapping data items) have been found with equal ETI values may be further tagged.

In step 8082, the bridging device 10 may send a message to the application extension 41 for generating a display of a request form on the user interface. The form may comprise at least one field to be filled by the user for each tagged reference value. In some embodiments, the form may comprise a field for each reference value of the request according to the predefined request format, the fields of the tagged reference values being empty, and the fields of the other reference values being pre-filled with the matching data items of the input data block.

If the user inputs values in the form of the application interface 40 for the tagged reference values, the values may be transmitted to the bridging device 10.

The user may further modify the other request parameter values. If so, the updated values may be also transmitted to the bridging device 10 and the bridging device 10 may generate the request on the basis of the updated values for the request parameters instead of the value determined by the bridging device.

The content delivery method may then process with the request generation step (808).

It should be noted that in some embodiments, the request form may be displayed in the area 403 at the launch of the application extension. The request parameter fields may be filled dynamically in response to pairs of request parameter/value returned by the bridging device 10. The bridging device 10 may return such pairs each time a value is found for a request parameter, and even before the request generation condition is tested in step 805.

In such embodiment, the user may update the values any time, such update being transmitted to the bridging device which then replaces the value of the request with the new value specified by the user. In embodiments where a form is displayed to the user to enable him to provide a value for request parameters for which no mapping has been found or to correct a candidate value identified by the bridging device for each request parameter, the bridging device 10 may collect meta-learning data from the corrections or inputs thus provided by the user for subsequent mapping processing.

If two data items have been mapped to a same reference value and have a same ETI scoring, the bridging device 10 may select arbitrarily one of them or use contextual data to select one of them.

Figure 9:
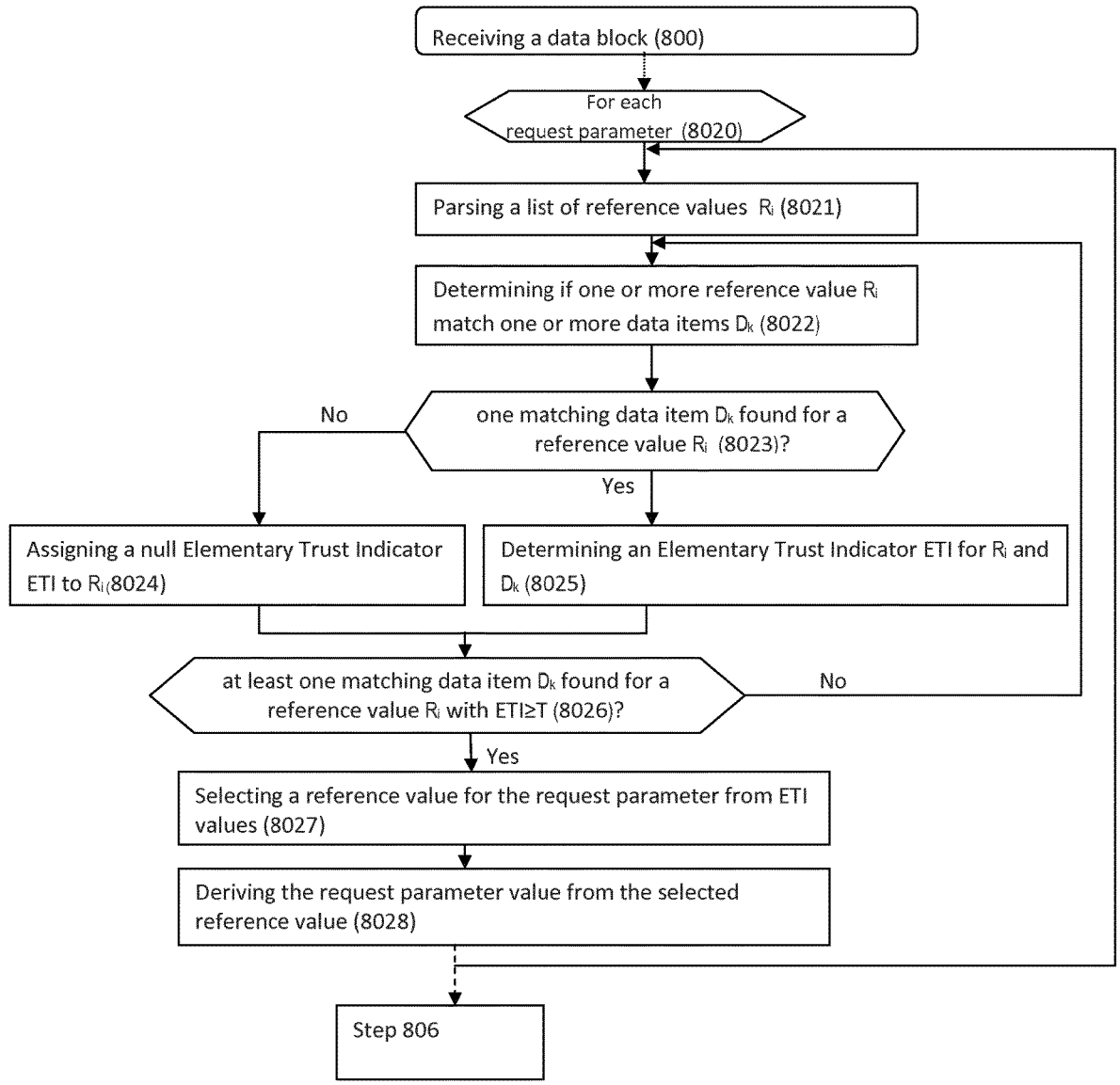
FIG. 9 is a flowchart illustrating the processing an input data block, in accordance with an embodiment of the invention.

FIG. 9 is a flowchart depicting the step of processing a data block, according to one embodiment (step 802 of FIG. 7).

The processing step may be implemented in response to the receipt of a data block from the application 4 (step 800 of FIG. 7).

In step 8020, the bridging device 10 may process each request parameter.

In step 8021, a list of predefined reference values $R_i$ corresponding to the request parameter may be parsed. The list of predefined reference values $R_i$ may have been previously received from the content provider system 2 and stored. Alternatively, the reference value $R_i$ may be stored in one or more databases (public and/or private databases). The reference values corresponding to possible values for the reference parameter, or values which are equivalent or synonymous to such possible values of the request parameter.

In step 8022, for each reference value $R_i$ (block 8021), it may be determined if a mapping exists between the reference value $R_i$ and a data item of the input data block or of the auxiliary data by comparing the list of reference values associated with the reference value $R_i$ with the data items of the input data block and/or the auxiliary data. In some embodiments, a data item may be processed only if it has the same category as the request parameter.

If it is determined that a data item $D_k$ matches a reference value associated with the reference value $R_i$ (block 8023), an Elementary Trust Indicator ETI may be determined for the mapping between $R_i$ and $D_k$ in step 8025. Otherwise a null value may be assigned to the reference value in step 8024.

The processing of reference values for a given request parameter may be terminated, when at least one mapping has been found with an ETI higher or equal to a predefined threshold T (block 8023) in step 8026.

In step 8028, the value of the request parameter may be derived from one of the reference value for which a mapping has been found with a data item of the input data block or of the auxiliary data depending on the ETI scoring (selected in step 8026).

The process may be then iterated for at least some of the other request parameters. The process may then proceed with step 806 of FIG. 7.

Figure 10:
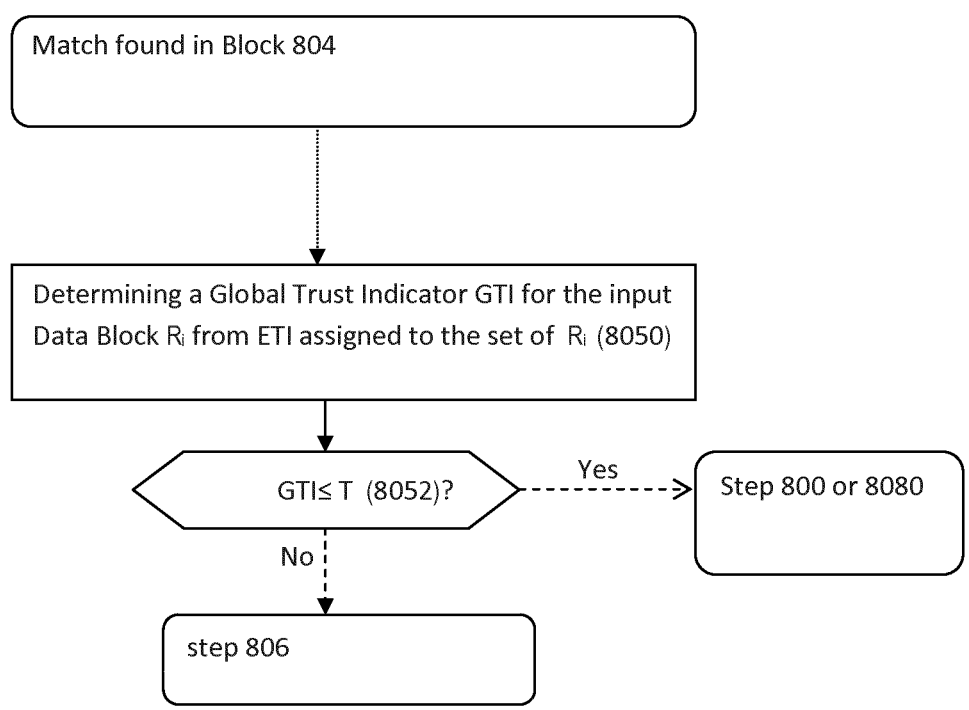
FIG. 10 is a flowchart illustrating the process of determining if a request generation condition is satisfied, in accordance with an embodiment of the invention.

FIG. 10 is a flowchart depicting the process of determining if a request generation condition is satisfied, according to one embodiment (step 805 of FIG. 7).

The process may be triggered if at least one match is found for at least some of the request parameters (block 804 of FIG. 7).

The process may comprise determining a Global Trust Indicator (GTI) for the input data block, in step 8052, based on the Elementary Trust Indicators ETI determined for the reference values used to derive the value of each request parameter.

In step 8054, a condition related to the GTI value may be determined. For example, it may be determined if the GTI value is lower or equal to a predefined threshold T. In such embodiment, the request generation condition is thus a condition related to the GTI.

If the condition of step 8054 is satisfied, a request may be generated as described previously in step 806.

Otherwise, if the condition of step 8054 is not satisfied, the process may return to step 800 as depicted in FIG. 7 or perform step 8080 as depicted in FIG. 8.

Figure 11:
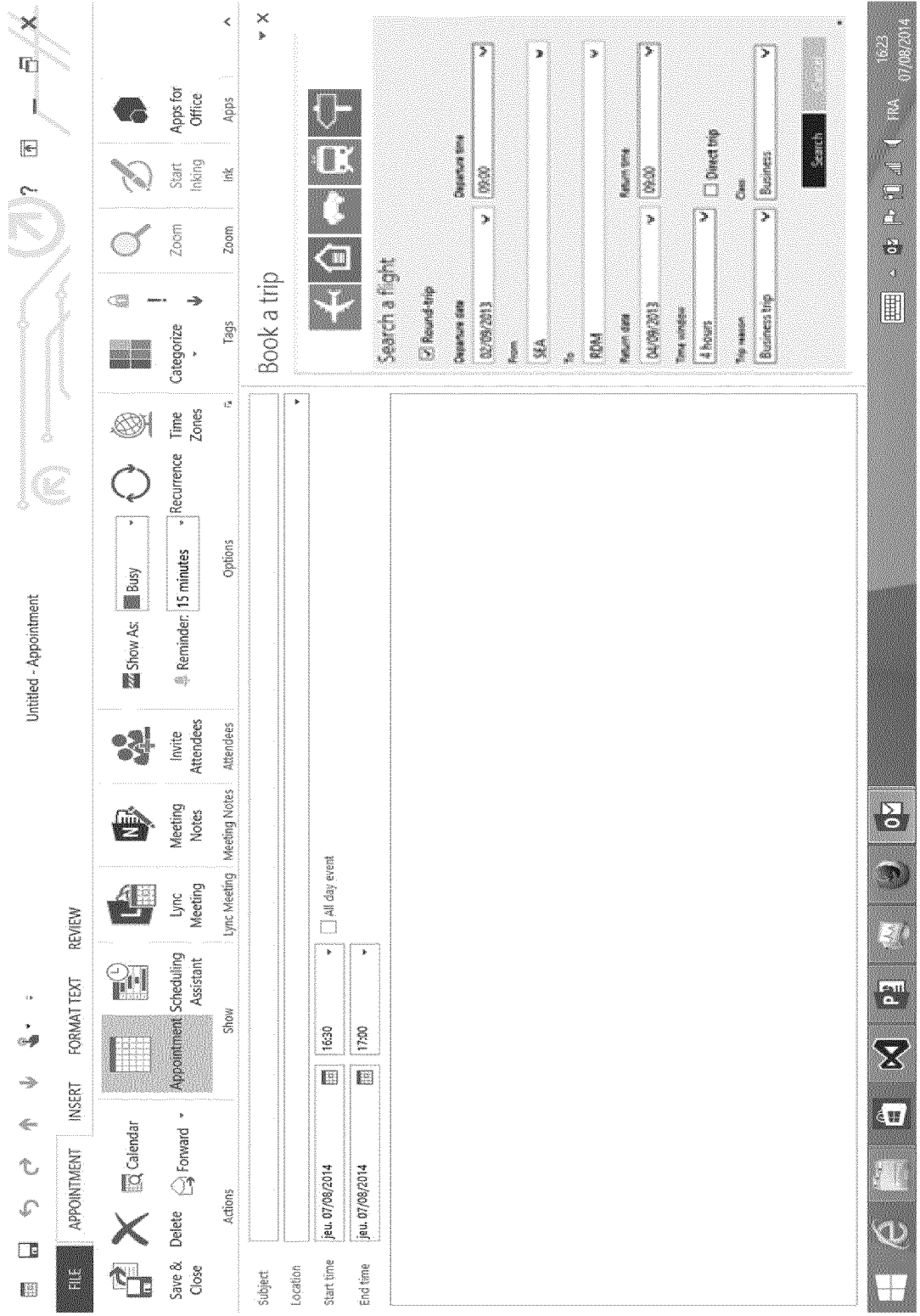
FIG. 11 is a view of an application interface, according to an exemplary embodiment.
Figure 12:
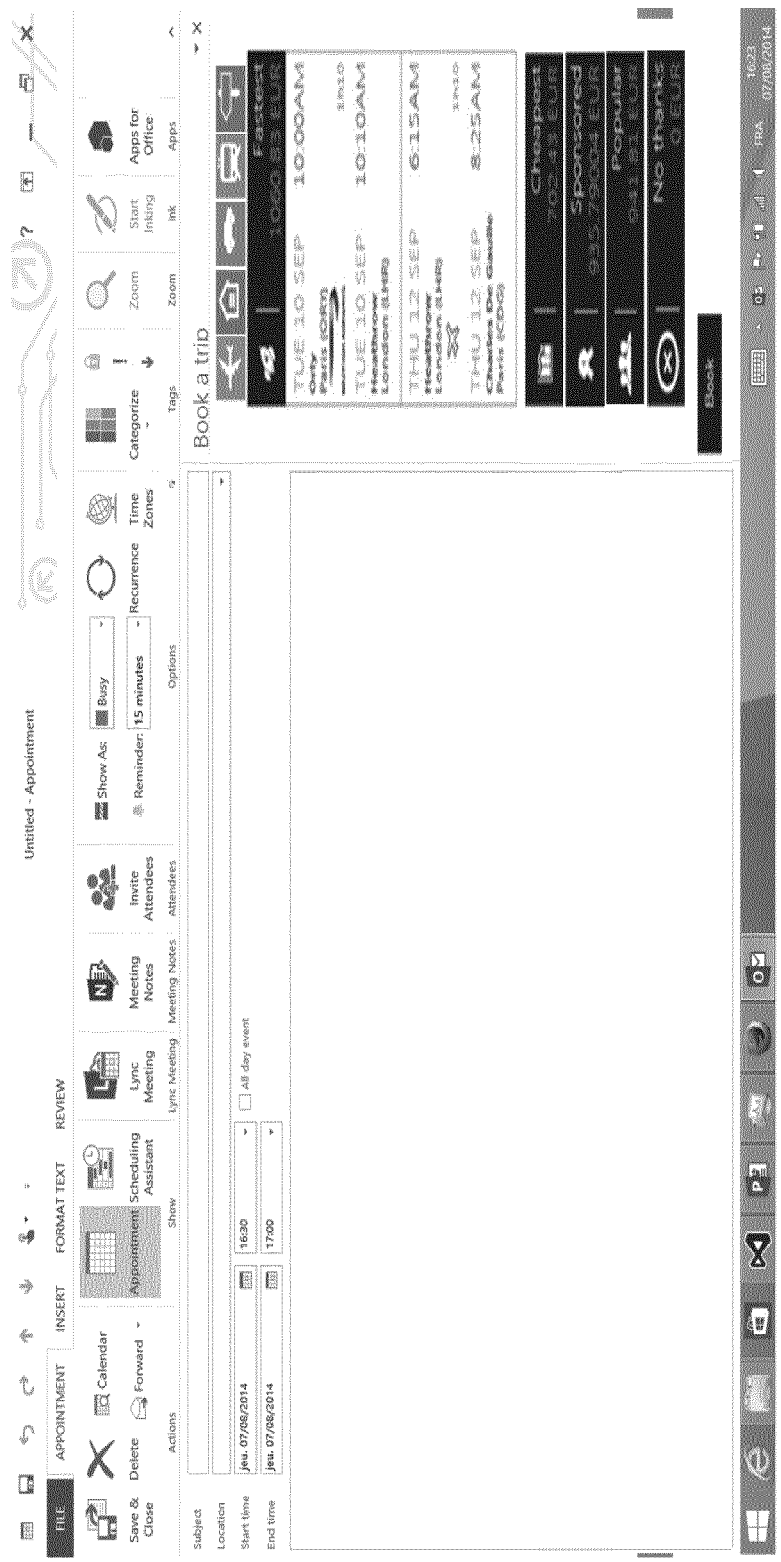
FIG. 12 is another view of the application interface of FIG. 11, according to an exemplary embodiment.
Figure 13:
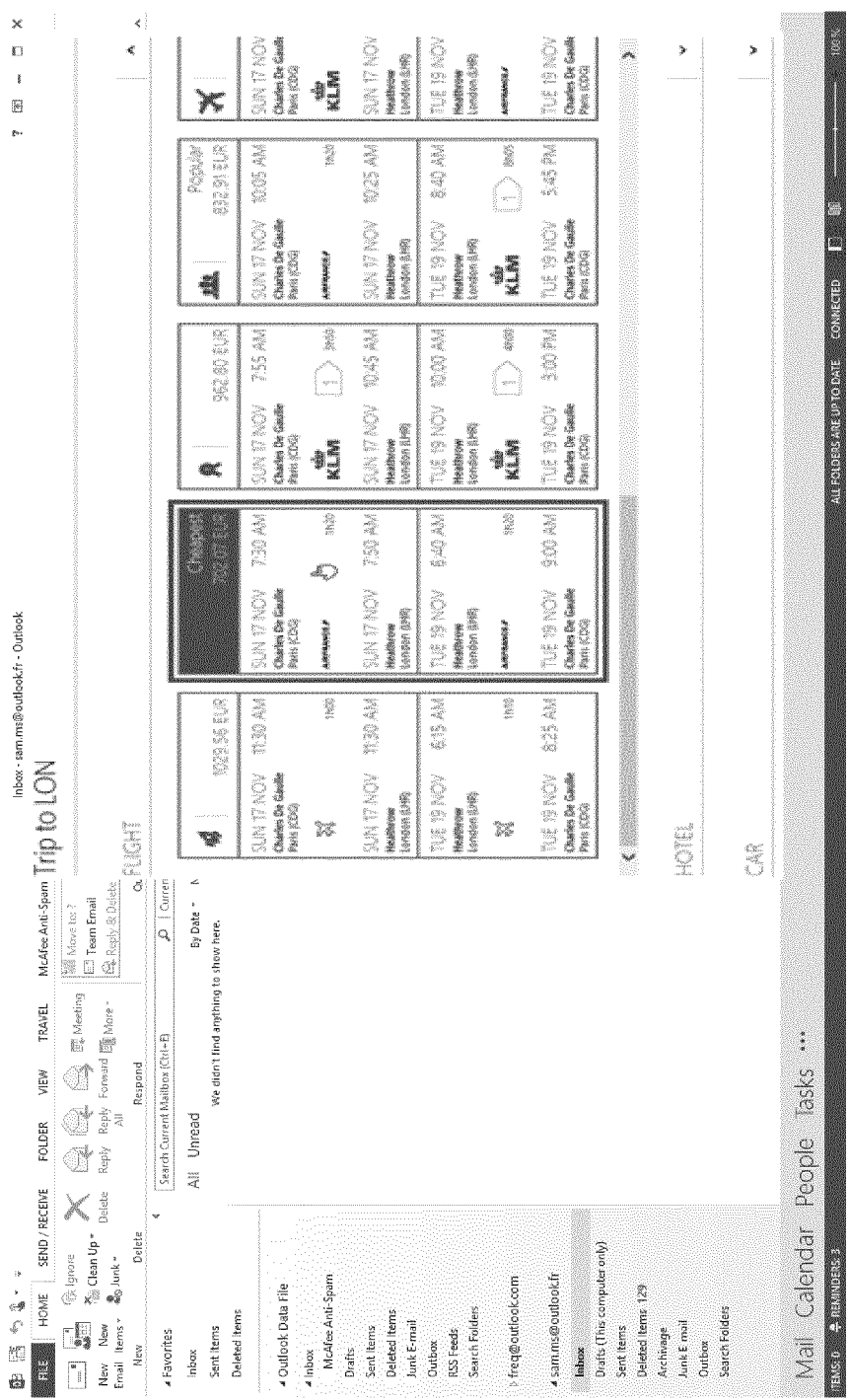
FIG. 13 is a view of an application interface, according to another exemplary embodiment.

FIGS. 11 to 13 show successive views of an exemplary application interface 40 of a messaging application 4 comprising a meeting management tool and connected to a travel provider system 2 through a bridging device 10. The user may access to the application to create a meeting or open an existing meeting. The data items input by the user in the application 4 are structured as name/value.

The view of FIG. 11 corresponds to an initial phase of the content delivering method in which the user has opened the meeting tool to create an event. The tool comprises a set of boxes including attendees boxes to indicate the attendees to the meeting, a subject box to indicate the subject of the meeting, a location box to indicate the location of the meeting, start and end time boxes to indicate the start or the end of the meeting, a meeting message box where information related to the meeting can be input. In the initial phase, the boxes are all empty and the application extension 41 has been automatically launched.

An area 700 is dedicated to the application extension 41, the interface of this area dynamically changing as the user inputs data in the boxes. In the embodiments of FIGS. 12 and 13, a request form is displayed in the dedicated interface area 403 of the application interface 40 and the fields of the request form may be dynamically filled as a result of the processing performed by the bridging device.

In the example of FIG. 11, the user has input a start date/time and an end date/time in the corresponding boxes of the meeting tool. These inputs are passed to the bridging device 10 in the form of an input data block. The bridging device 10 then processes the input data block and determines an association between the data items of this input data block and a set of reference values corresponding to the standard travel request parameters. As shown in the left part of the application interface, the request parameters include:

- a departure date derived by the bridging device 10 from the start date of the meeting;
- a departure time derived by the bridging device 10 from the start time of the meeting;
- a return date derived by the bridging device 10 from the end date of the meeting;
- a return time derived by the bridging device 10 from the end time of the meeting;
- a departure location (corresponding to the field "from" of the area 700) set to "SEA" location (Seattle); the departure location may be derived by the bridging device 10 from an auxiliary source such as the user profile which provides the location of the user;
- an arrival location (corresponding to the field "to" of the area 700) set to "RDM" location (RDM is the IATA code for Redmond Municipal Airport, in Oregon US); the arrival location may be derived by the bridging device 10 from user inputs since no location has been yet indicated by the user.

The bridging device 10 then converts the format of the departure and arrival location into their 'travel-industry' corresponding name as defined by the IATA standard (IATA stands for "International Air Transport Association") code using a mapping table which associates each location to a standard location. The location "SEA" is thus converted into the corresponding standard location "PARIS" and the location "RDM" being converted into the standard location Heathrow. The bridging device 10 then generates the request accordingly and sends the generated request to the content provider system 2 which returns the result to the application 4 through the bridging device 10. The application extension 41 displays the result in the area 700 in the form of travel proposals matching the location.

Although FIG. 11 illustrates a simplified example in which data items of IATA types are detected in the input data block to determine the location request parameters, the skilled person will readily understand that the invention also applies to data items that are not IATA standards for such request parameters such as for example a data item "Room 345" which may be decoded by the bridging device 10 into an input for the travel request (e.g. Room 345 will be submitted to the travel system as airport RDM, as it is the most relevant).

Accordingly the user actions are transparently processed to detect a need for a travel request and generate such request dynamically in an area 403 of the application interface, while not interrupting the user in his or her main action (create a meeting event) except if he/she decides to turn to the dedicated area. The user may disregard the results displayed in the area 403 or select a travel proposal by pointing in the "book" button.

In some embodiments, the results of the request may be displayed in a pop-up window as shown in FIG. 13 instead of being displayed in the area 4903. In the example shown in FIG. 13, the pop-up window comprises travel proposals offered by two companies AIR FRANCE and KLM (AIR FRANCE is a trademark of SOCIETE AIR FRANCE; KLM is a trademark and brand of K.L.M. (H.K.) LTD). In an embodiment, the bridging device 10 may return the results to the application 4 together with a reliability flag indicating if the results are to be displayed in area 700 or in a pop-up window. The reliability flag may be computed by the bridging device 10 as a function of the Elementary Trust Indicators determined for the reference values. The bridging device 10 may thus assign a flag value corresponding to a pop-up window display when the mapping between the reference values and the data items has a high level of reliability, that is corresponds to a high likelihood that a user needs content from the content provider system 2.

Figure 14:
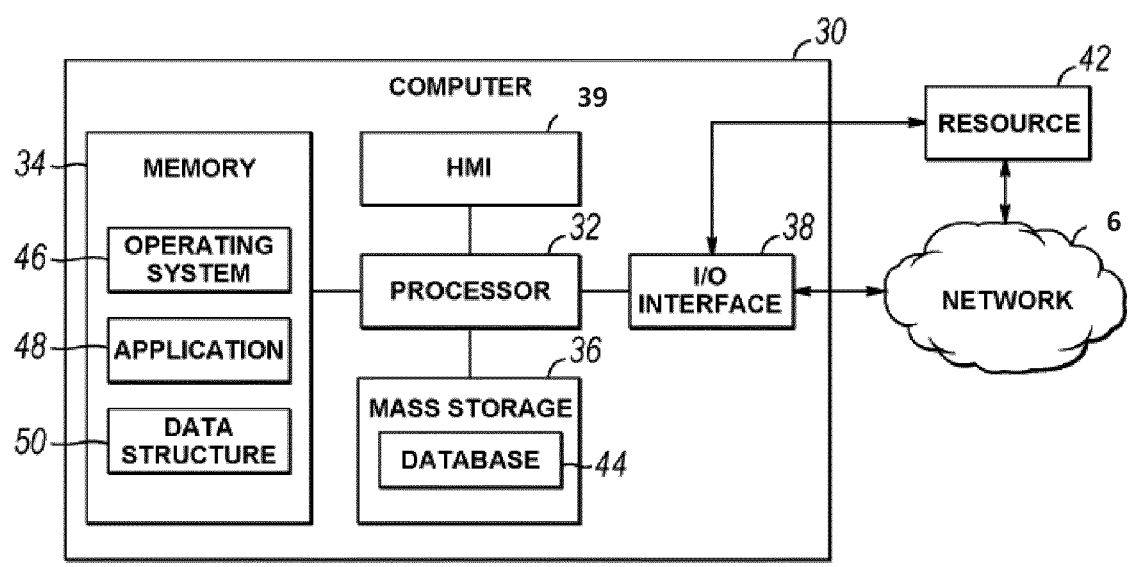
FIG. 14 is a diagrammatic view of an exemplary computer system for hosting the systems or the devices of FIG. 1.

Referring now to FIG. 14, the content provider system 2, the bridging device 10 and the user devices 3, 5 of the operating environment may be implemented on one or more computing devices or systems, referred to collectively as a computer, such as computer 30. The computer 30 may include a processor 32, a memory 34, a mass storage memory device 36, an input/output (I/O) interface 38, and a Human Machine Interface (HMI) 39. The computer 30 may also be operatively coupled to one or more external resources 42 via the network 6 (which may be network 60, 61 or 62 for example) and/or I/O interface 38. External resources may include, but are not limited to, servers, databases, mass storage devices, peripheral devices, cloud-based network services, or any other suitable computing resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 6 and/or external resource 42. The application 48 may thereby work cooperatively with the network 6 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 6, such as a cloud computing service.

The HMI 39 (such as HMI 30 in the implementation of FIG. 1 of a user device 3) may be operatively coupled to the processor 32 of computer 30 in a known manner to allow a user of the computer 30 to interact directly with the computer 30. The HMI 39 may include video and/or alphanumeric displays, a touch screen, a speaker, and any other suitable audio and visual indicators capable of providing information to the user. The HMI 39 may also include input devices and controls such as an alphanumeric keyboard, a pointing device, keypads, pushbuttons, control knobs, microphones, etc., capable of accepting commands or input from the user and transmitting the entered input to the processor 32.

The database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, an object-oriented database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

While the invention has particular advantages for content provider systems that support requests comprising at least some request parameters related to a date, a time and/or a location, such as a travel provider system, the skilled person will readily understand that the invention is not limited to such content provider systems and may be applied to various content provider systems, such as a real-estate search system.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. For example, the processing step 802 may be implemented using different optimized search techniques to determine association between each reference value and a data item. Further, the area 403 of the application interface 40 may be dynamically adjusted depending on the data to be displayed and/or information received by the bridging device such as the reliability flag. While the embodiments of FIGS. 7 to 10 have been described according to a particular step order, the skilled person will readily understand that the invention is not limited to such sequence of steps and that some steps can be implemented in a different order. More generally, in certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The invention claimed is:

1. A system for delivering content from a content provider system to a user device, the content provider system being configured to deliver the content in response to a request having one or more predefined formats, the user device comprising an application executing on the user device, the application being associated with an application interface, the application being configured to receive input data from at least one user through the application interface, the input data comprising a plurality of data items, the application comprising an application extension, and the system comprising:

a bridging device configured to dynamically connect the application to the content provider system during execution of the application extension, the application extension being configured to activate a connection to the bridging device in response to detecting an activation condition, the application being configured to transmit at least some of the data items to the bridging device during the connection to the bridging device, and the bridging device being configured to generate the request according to one of the one or more predefined formats using each data item transmitted from the application to the bridging device and to transmit the request to the content provider system.

2. The system of claim 1, wherein the request includes a plurality of request parameters, and the bridging device comprises:

a parser configured to parse a plurality of reference values for each request parameter, in response to receiving an input data block containing one or more of the data items; and a mapper configured to determine if at least some of the reference values map each data item contained in the input data block or in one or more auxiliary sources, the mapper being further configured to associate an elementary scoring to each data item mapping one of the reference values.

3. The system of claim 2, wherein each reference value is associated with a list including a plurality of auxiliary values, and the mapper is configured to determine a mapping between each reference value and each data item contained in the input data block or in the one or more auxiliary sources.

4. The system of claim 2 wherein the bridging device comprises:

a request generator configured to generate the request based on the elementary scoring associated with each data item, the request comprising request parameters, each request parameter being associated with one or more of the reference values, each request parameter having a value derived from the elementary scoring associated to each data item mapping one of the reference values; and wherein the bridging device is further configured to send the request to the content provider system.

5. The system of claim 4, wherein the value of each request parameter is determined from the reference value for which the elementary scoring is highest.

6. The system of claim 5, wherein the bridging device is configured to determine the value of each request parameter using a function defining a relationship between the value of each request parameter and the one or more of the reference values.

7. The system of claim 2, wherein the bridging device further comprises:

a converter configured to convert a first format of a reference value into a second format of the request parameter associated with the reference value.

8. The system of claim 1, wherein the application is associated with a data memory configured to store the data items.

9. The system of claim 1, wherein the application comprises a user data memory configured to store a user identifier, the application extension is configured to transparently and securely transmit the user identifier to the bridging device, and the bridging device is configured to control access of the at least one user to the content provider system using the user identifier.

10. The system of claim 1, wherein the bridging device is configured to receive the content from the content provider system in response to the request, the bridging device is configured to transmit the content to the application, and the application comprises a rendering unit for rendering the content in a dedicated area of the application interface.

11. The system of claim 10, wherein the rendering unit is configured to dynamically adjust a plurality of dimensions of the application as a function of the content transmitted by the bridging device.

12. A method of delivering content from a content provider system to a user device, the content provider system being configured to deliver the content in response to a request having one or more predefined formats, the user device comprising an application executing on the user device, the application being associated with an application interface, the application being configured to receive input data in one or more input data blocks from at least one user through the application interface, the input data comprising a plurality of data items, the application comprising an application extension, and the method comprising:
 dynamically connecting the application to the content provider system via a bridging device during execution of the application extension;
 activating, by the application extension, a connection to the bridging device in response to detecting an activation condition;
 transmitting at least some of the data items comprised in each input data block from the application to the bridging device during the connection to the bridging device;
 generating, by the bridging device, the request for the content according to one of the one or more predefined formats using each data item transmitted from the application to the bridging device; and
 transmitting the request from the bridging device to the content provider system.

13. The method of claim 12, wherein the request includes a plurality of request parameters, and further comprising:
 parsing, by the bridging device, a plurality of reference values for each request parameter, in response to receiving the input data in the one or more input data blocks; and
 determining, by the bridging device, if at least some of the reference values map one of the data items comprised in the one or more input data blocks or in one or more auxiliary sources; and
 associating, by the bridging device, an elementary scoring to each data item mapping one of the reference values.

14. The method of claim 13, wherein each reference value is associated with a list including a plurality of auxiliary values, and further comprising:
 determining, by the bridging device, a mapping between each reference value and each data item contained in the one or more input data blocks or in the one or more auxiliary sources.

15. The method of claim 13, further comprising:
 generating, by the bridging device, the request based on the elementary scoring associated with each data item, the request comprising request parameters, each request parameter being associated with one or more of the reference values, each request parameter having a value derived from the elementary scoring associated to each data item mapping one of the reference values; and
 sending the request from the bridging device to the content provider system.

16. The method of claim 15, wherein the value of each request parameter is determined from the reference value for which the elementary scoring is highest.

17. The method of claim 16, further comprising:
 determining, by the bridging device, the value of each request parameter using a function defining a relationship between the value of each request parameter and the one or more of the reference values.

18. The method of claim 13, further comprising:
 converting, by the bridging device, a first format of a reference value into a second format of the request parameter associated with the reference value.

19. The method of claim 12, wherein the application is associated with a data memory configured to store the data items.

20. The method of claim 12, wherein the application includes a user data memory configured to store a user identifier, the application extension is configured to transparently and securely transmit the user identifier to the bridging device, and further comprising:
 controlling, by the bridging device, access of the at least one user to the content provider system using the user identifier.

21. The method of claim 12, further comprising:
 receiving, by the bridging device, the content from the content provider system in response to the request;
 transmitting, by the bridging device, the content to the application; and
 rendering, by the application, the content in a dedicated area of the application interface.

22. The method of claim 21, further comprising:
 dynamically adjust a plurality of dimensions of the application as a function of the content transmitted by the bridging device.

23. A computer program product comprising:
 a non-transitory computer-readable storage medium; and
 instructions stored on the non-transitory computer-readable storage medium that, when executed by a processor, cause the processor to deliver content from a content provider system to a user device, the content provider system being configured to deliver the content in response to a request having one or more predefined formats, the user device comprising an application executing on the user device, the application being associated with an application interface, the application being configured to receive input data in one or more input data blocks from at least one user through the application interface, the input data comprising a plurality of data items, and the application comprising an application extension, the instructions comprising:
 dynamically connecting the application to the content provider system via a bridging device during execution of the application extension;
 activating, by the application extension, a connection to the bridging device in response to detecting an activation condition;
 transmitting at least some of the data items comprised in each input data block from the application to the bridging device during the connection to the bridging device;
 generating, by the bridging device, the request for the content according to one of the one or more predefined formats using each data item transmitted from the application to the bridging device; and
 transmitting the request from the bridging device to the content provider system.

* * * * *